(12) United States Patent
Xie et al.

(10) Patent No.: US 11,388,017 B2
(45) Date of Patent: Jul. 12, 2022

(54) COMMUNICATION OPTIMIZATION SYSTEMS OF BLOCKCHAIN NETWORK, REGISTRATION METHODS AND MESSAGE FORWARDING METHODS

(71) Applicant: ALIPAY (HANGZHOU) INFORMATION TECHNOLOGY CO., LTD., Zhejiang (CN)

(72) Inventors: Youpeng Xie, Hangzhou (CN); Guannan Kou, Hangzhou (CN); Wenxiang Jin, Hangzhou (CN); Rungui Ye, Hangzhou (CN); Lingtao Kong, Hangzhou (CN); Chao Zeng, Hangzhou (CN); Liman Hou, Hangzhou (CN); Yifan Chen, Hangzhou (CN); Jiang Wang, Hangzhou (CN); He Sun, Hangzhou (CN); Ke Liu, Hangzhou (CN); Lei Zhang, Hangzhou (CN); Han Xiao, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/360,392

(22) Filed: Jun. 28, 2021

(65) Prior Publication Data
US 2021/0344519 A1   Nov. 4, 2021

(30) Foreign Application Priority Data

Aug. 28, 2020   (CN) .......................... 202010884713.4

(51) Int. Cl.
*H04L 12/18*   (2006.01)
*H04L 45/02*   (2022.01)
(Continued)

(52) U.S. Cl.
CPC .......... *H04L 12/1854* (2013.01); *H04L 45/02* (2013.01); *H04L 45/028* (2013.01);
(Continued)

(58) Field of Classification Search
CPC ... H04L 12/1854; H04L 45/02; H04L 45/028; H04L 47/125; H04L 67/1042; H04L 67/16; H04L 67/28
See application file for complete search history.

(56) References Cited

U.S. PATENT DOCUMENTS

2014/0244746 A1   8/2014   Ross et al.
2020/0076610 A1   3/2020   Wang
(Continued)

FOREIGN PATENT DOCUMENTS

CN   1403934   3/2003
CN   103475566   12/2013
(Continued)

OTHER PUBLICATIONS

Singe Rusch et al. "BLOXY: Providing Transparent and Generic BFT-Based Ordering Services for Blockchains", 2019 38th Symposium on Reliable Distributed Systems (SRDS), 10 pages. (Year: 2019).*

(Continued)

*Primary Examiner* — George C Neurauter, Jr.
(74) *Attorney, Agent, or Firm* — Fish & Richardson P.C.

(57) ABSTRACT

Methods, systems, and apparatus for optimizing communication in a blockchain network. An example method includes establishing, by a first relay node in the blockchain network, a connection with a first blockchain node in the blockchain network in response to a connection request of the first blockchain node; receiving, by the first relay node, a registration request transmitted by the first blockchain node; generating, by the first relay node, a registration event (Continued)

based on the registration request; updating, by the first relay node, a local routing table based on the registration event; and forwarding, by the first relay node, a message of the first blockchain node to another relay node or another blockchain node in the blockchain network that is connected to the first relay node based on the local routing table.

20 Claims, 19 Drawing Sheets

(51) Int. Cl.
    *H04L 47/125* (2022.01)
    *H04L 67/1042* (2022.01)
    *H04L 67/51* (2022.01)
    *H04L 67/56* (2022.01)
    *H04L 45/028* (2022.01)

(52) U.S. Cl.
    CPC ........ *H04L 47/125* (2013.01); *H04L 67/1042* (2013.01); *H04L 67/51* (2022.05); *H04L 67/56* (2022.05)

(56) References Cited

U.S. PATENT DOCUMENTS

| | | | |
|---|---|---|---|
| 2020/0119925 | A1 | 4/2020 | Wang |
| 2020/0213215 | A1* | 7/2020 | Jayadevappa ....... H04L 63/0876 |
| 2020/0228409 | A1* | 7/2020 | Li ............................ G06F 16/27 |
| 2020/0236031 | A1* | 7/2020 | Singla ................... H04L 45/028 |
| 2020/0236032 | A1* | 7/2020 | Singla ..................... H04L 45/02 |

FOREIGN PATENT DOCUMENTS

| | | |
|---|---|---|
| CN | 109639550 | 4/2019 |
| CN | 109996306 | 7/2019 |
| CN | 110445882 | 11/2019 |
| CN | 110535697 | 12/2019 |
| CN | 110650189 A | 1/2020 |
| CN | 110751475 | 2/2020 |
| CN | 110944058 | 3/2020 |
| CN | 111416808 | 7/2020 |
| CN | 111447290 | 7/2020 |
| WO | WO 2019120318 | 6/2019 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

Extended European Search Report in European Appln. No. 21182263.0, dated Dec. 2, 2021, 8 pages.

* cited by examiner (node 1; region 1,1; ip_3)
(node 1; region 2,0; ip_2)
(node 2; region 1,1; ip_1)
(node 2; region 2,0; ip_3)
(node 3; region 1,1; ip_3)
(node 3; region 2,0; ip_2)
(node 4; region 3,1; ip_1)
(node 4; region 4,0; ip_2)
(node 5; region 3,1; ip_2)
(node 5; region 4,0; ip_3)
(node 6; region 3,1; ip_3)
(node 6; region 4,0; ip_1)

FIG. 13

(A;node 1;region 1,1;ip_3)
(A;node 1;region 2,0;ip_2)
(B;node 2;region 1,1;ip_1)
(B;node 2;region 2,0;ip_3)
(A;node 3;region 1,1;ip_3)
(A;node 3;region 2,0;ip_2)
(A;node 4;region 3,1;ip_1)
(A;node 4;region 4,0;ip_2)
(A;node 5;region 3,1;ip_2)
(A;node 5;region 4,0;ip_3)
(B;node 6;region 3,1;ip_3)
(B;node 6;region 4,0;ip_1)

FIG. 15

COMMUNICATION OPTIMIZATION SYSTEMS OF BLOCKCHAIN NETWORK, REGISTRATION METHODS AND MESSAGE FORWARDING METHODS

CROSS-REFERENCE TO RELATED APPLICATIONS

This application claims priority to Chinese Patent Application No. 202010884713.4, filed on Aug. 28, 2020, which is hereby incorporated by reference in its entirety.

TECHNICAL FIELD

The present specification relates to the field of information technologies, and in particular, to communication optimization systems of a blockchain network, registration methods and message forwarding methods.

BACKGROUND

Blockchain networks are constructed based on peer to peer (P2P) networks. When messages are transmitted between blockchain nodes in a peer-to-peer way, a blockchain node needs to generate a plurality of broadcast messages and transmits the broadcast messages to other blockchain nodes respectively, resulting in the occupation of a large uplink bandwidth and a large cross-regional bandwidth by the blockchain node. This problem is more severe in a consortium blockchain with relatively frequent broadcastings.

Accordingly, it is desirable to provide a solution that can reduce the occupation of the uplink bandwidth and the cross-regional bandwidth by the blockchain node.

SUMMARY

One of embodiments of the present specification provides a communication optimization system of a blockchain network. The communication optimization system includes: two or more relay nodes, and a global node. The relay node is configured to: establish a connection with a blockchain node in response to a connection request of the blockchain node; receive a registration request transmitted by the blockchain node, where the registration request includes an ID of the blockchain node and an ID of a relay node connected to the blockchain node; generate a registration event based on the registration request and transmit the registration event to the global node, where the registration event includes the ID of the blockchain node and the ID of the relay node connected to the blockchain node; update a local routing table based on the obtained registration event, where the local routing table includes a corresponding relationship between the ID of the blockchain node and the ID of the relay node connected to the blockchain node; and forward a message of the blockchain node based on the local routing table. The global node is configured to transmit a registration event of any relay node to another relay node.

One of the embodiments of the present specification provides a registration method of a communication optimization system-based on a blockchain network. The communication optimization system includes: two or more relay nodes, and a global node. The relay node includes an IP module, a first load balancing module, a group of proxy nodes, a service discovery module, and a first database. The method is performed by any proxy node in the relay node, and includes the following: a registration request of a blockchain node is received from a first load balancing module of the same relay node, and a connection with the blockchain node is established in response to the registration request; a registration event is generated based on the registration request; the registration event is transmitted to a service discovery module of the same relay node, so the service discovery module of the same relay node transmits the registration event to the global node, and the global node transmits the registration event to a service discovery module of another relay node; a registration event of another relay node is received from the service discovery module of the same relay node; and a local routing table is updated based on the obtained registration event.

One of the embodiments of the present specification provides a registration system of a blockchain network-based communication optimization system. The communication optimization system includes: two or more relay nodes, and a global node. The relay node includes a first load balancing module, a group of proxy nodes, a service discovery module, and a first database. The registration system is implemented on any proxy node in the relay node, and includes: a connection module, configured to receive a registration request of a blockchain node from a first load balancing module of the same relay node, and establish a connection with the blockchain node in response to the registration request; a registration event generation module, configured to generate a registration event based on the registration request; a registration event transmission module, configured to transmit the registration event to a service discovery module of the relay node, so the service discovery module of the same relay node transmits the registration event to the global node, and the global node transmits the registration event to a service discovery module of another relay node; a registration event receiving module, configured to receive a registration events of another relay node from the service discovery module of the relay node; and a local routing table updating module, configured to update a local routing table based on the obtained registration event.

One of the embodiments of the present specification provides a registration apparatus of a blockchain network-based communication optimization system. The registration apparatus includes a processor and a storage device, where the storage device is configured to store an instruction that, when executed by the processor, implements the registration method according to any one of the embodiments of the present specification.

One of the embodiments of the present specification provides a message forwarding method of a blockchain network-based communication optimization system. The communication optimization system includes two or more relay nodes. The relay node includes a first load balancing module and a group of proxy nodes. A local routing table of the proxy node includes a corresponding relationship among an ID of a blockchain node, an IP of a proxy node connected to the blockchain node, and an ID of a relay node connected to the blockchain node. The method is performed by any proxy node in the relay node, and includes the following: a unicast message including an ID of a destination blockchain node is received from a first load balancing module of the same relay node; whether a relay node that is connected to the destination blockchain node is a current relay node is determined; if not, an IP of a first load balancing module of the relay node connected to the destination blockchain node is determined based on an ID of the relay node connected to the destination blockchain node, and the unicast message is transmitted to the first load balancing module of the relay node connected to the destination blockchain node based on the IP of the first load balancing module of the relay node connected to the destination blockchain node; and if yes, whether a proxy node connected to the destination blockchain node is a current proxy node is determined, if yes, the unicast message is transmitted to the connected destination blockchain node, and otherwise the unicast message is transmitted to the proxy node connected to the destination blockchain node based on an IP of the proxy node connected to the destination blockchain node.

One of the embodiments of the present specification provides a message forwarding system of a blockchain network-based communication optimization system, where the communication optimization system includes two or more relay nodes. The relay node includes a first load balancing module and a group of proxy nodes. A local routing table of the proxy node includes a corresponding relationship among an ID of a blockchain node, an IP of a proxy node connected to the blockchain node, and an ID of a relay node connected to the blockchain node. The message forwarding system is implemented on any proxy node in the relay node, and includes: a message receiving module, configured to receive a unicast message including an ID of a destination blockchain node from a first load balancing module of the same relay node; and a unicast message forwarding module, configured to: determine whether a relay node connected to the destination blockchain node is a current relay node; if no, determine an IP of a first load balancing module of the relay node connected to the destination blockchain node based on an ID of the relay node connected to the destination blockchain node, and transmit the unicast message to the first load balancing module of the relay node connected to the destination blockchain node based on the IP of the first load balancing module of the relay node connected to the destination blockchain node; and if yes, determine whether a proxy node connected to the destination blockchain node is a current proxy node, if yes, transmit the unicast message to the connected destination blockchain node, and otherwise transmit the unicast message to the proxy node connected to the destination blockchain node based on an IP of the proxy node connected to the destination blockchain node.

One of the embodiments of the present specification provides a message forwarding method of a blockchain network-based communication optimization system. The communication optimization system includes two or more relay nodes. The relay node includes a first load balancing module and a group of proxy nodes. A local routing table of the proxy node includes a corresponding relationship among an ID of a blockchain network, an ID of a blockchain node in the blockchain network, an IP of a proxy node connected to the blockchain node in the blockchain network, and an ID of a relay node connected to the blockchain node in the blockchain network. The method is performed by any proxy node in the relay node, and includes the following: a broadcast message including an ID of a destination blockchain network is received from a first load balancing module of the same relay node; a target corresponding relationship including the ID of the destination blockchain network is searched for in a broadcast routing table; whether the target corresponding relationship includes an ID of a current relay node is checked, and if yes, the broadcast message is transmitted to another proxy node in the current relay node; whether the target corresponding relationship includes an ID of another relay node is checked; if yes, an IP of a first load balancing module of the another relay node is determined based on the checked ID of the another relay node; and the broadcast message is transmitted to the first load balancing module of the another relay node based on the determined IP of the first load balancing module of the another relay node; whether the broadcast routing table includes a destination corresponding relationship including the ID of the destination blockchain network and an IP of a current proxy node is checked, and if yes, the broadcast message is transmitted to a connected blockchain node in the destination blockchain network based on an ID of the blockchain node in the destination corresponding relationship.

One of the embodiments of the present specification provides a message forwarding system of a blockchain network-based communication optimization system. The communication optimization system includes two or more relay nodes. The relay node includes a first load balancing module and a group of proxy nodes. A local routing table of the proxy node includes a corresponding relationship among an ID of a blockchain network, an ID of a blockchain node in the blockchain network, an IP of a proxy node connected to the blockchain node in the blockchain network, and an ID of a relay node connected to the blockchain node in the blockchain network. The message forwarding system is performed on any proxy node in the relay node, and includes: a message receiving module, configured to receive a broadcast message including an ID of a destination blockchain network from a first load balancing module of the same relay node; a target corresponding relationship searching module, configured to search for a target corresponding relationship including the ID of the destination blockchain network in a broadcast routing table; a first broadcast message forwarding module, configured to check whether the target corresponding relationship includes an ID of a current relay node, and if yes, transmit the broadcast message to another proxy node in the current relay node; a second broadcast message forwarding module, configured to check whether the target corresponding relationship includes an ID of another relay node, and if yes, determine an IP of a first load balancing module of the another relay node based on the checked ID of the another relay node, and transmit the broadcast message to the first load balancing module of the another relay node based on the determined IP of the first load balancing module of the another relay node; and a third broadcast message forwarding module, configured to check whether the broadcast routing table includes a destination corresponding relationship including the ID of the destination blockchain network and an IP of a current proxy node, and if yes, transmit the broadcast message to a connected blockchain node in the destination blockchain network based on an ID of the blockchain node in the destination corresponding relationship.

One of the embodiments of the present specification provides a message forwarding method of a blockchain network-based communication optimization system. The communication optimization system includes two or more relay nodes. The relay node includes a first load balancing module and a group of proxy nodes. A local routing table of the proxy node includes a corresponding relationship among an ID of a blockchain network, an ID of a blockchain node in the blockchain network, an IP of a proxy node connected to the blockchain node in the blockchain network, and an ID of a relay node connected to the blockchain node in the blockchain network. The method is performed by any proxy node in the relay node, and includes the following: a broadcast message is received from a first load balancing module of the same relay node; the broadcast message is transmitted to another proxy node in a current relay node; the broadcast message is transmitted to a first load balancing module of another relay node; whether the local routing table includes an IP of a current proxy node is checked, and if yes, the broadcast message is transmitted to a connected blockchain node based on an ID of the blockchain node in a corresponding relationship including the IP of the current proxy node.

One of the embodiments of the present specification provides a message forwarding system of a blockchain network-based communication optimization system. The communication optimization system includes two or more relay nodes. The relay node includes a first load balancing module and a group of proxy nodes. A local routing table of the proxy node includes a corresponding relationship among an ID of a blockchain network, an ID of a blockchain node in the blockchain network, an IP of a proxy node connected to the blockchain node in the blockchain network, and an ID of a relay node connected to the blockchain node in the blockchain network. The message forwarding system is implemented on any proxy node in the relay node, and includes: a message receiving module, configured to receive a broadcast message from a first load balancing module of the same relay node; a fourth broadcast message forwarding module, configured to transmit the broadcast message to another proxy node in a current relay node; a fifth broadcast message forwarding module, configured to transmit the broadcast message to a first load balancing module of another relay node; and a sixth broadcast message forwarding module, configured to check whether the local routing table includes an IP of a current proxy node, and if yes, transmit the broadcast message to a connected blockchain node based on an ID of the blockchain node in a corresponding relationship including the IP of the current proxy node.

One of the embodiments of the present specification provides a message forwarding apparatus of a blockchain network-based communication optimization system. The registration apparatus includes a processor and a storage device, where the storage device is configured to store an instruction that, when executed by the processor, implements the message forwarding method according to any one of the embodiments of the present specification.

BRIEF DESCRIPTION OF DRAWINGS

The present specification will be further described by way of example embodiments that will be described in detail with reference to the accompanying drawings. These embodiments are not intended to be limiting, and in these embodiments, same numerals refer to same structures, where:

FIG. 13 is a schematic diagram illustrating a local routing table of a proxy node, according to some embodiments of the present specification;

FIG. 15 is a schematic diagram illustrating a broadcast routing table of a proxy node in a multi-chain scenario, according to some embodiments of the present specification;

DETAILED DESCRIPTION OF EMBODIMENTS

Figure 1:
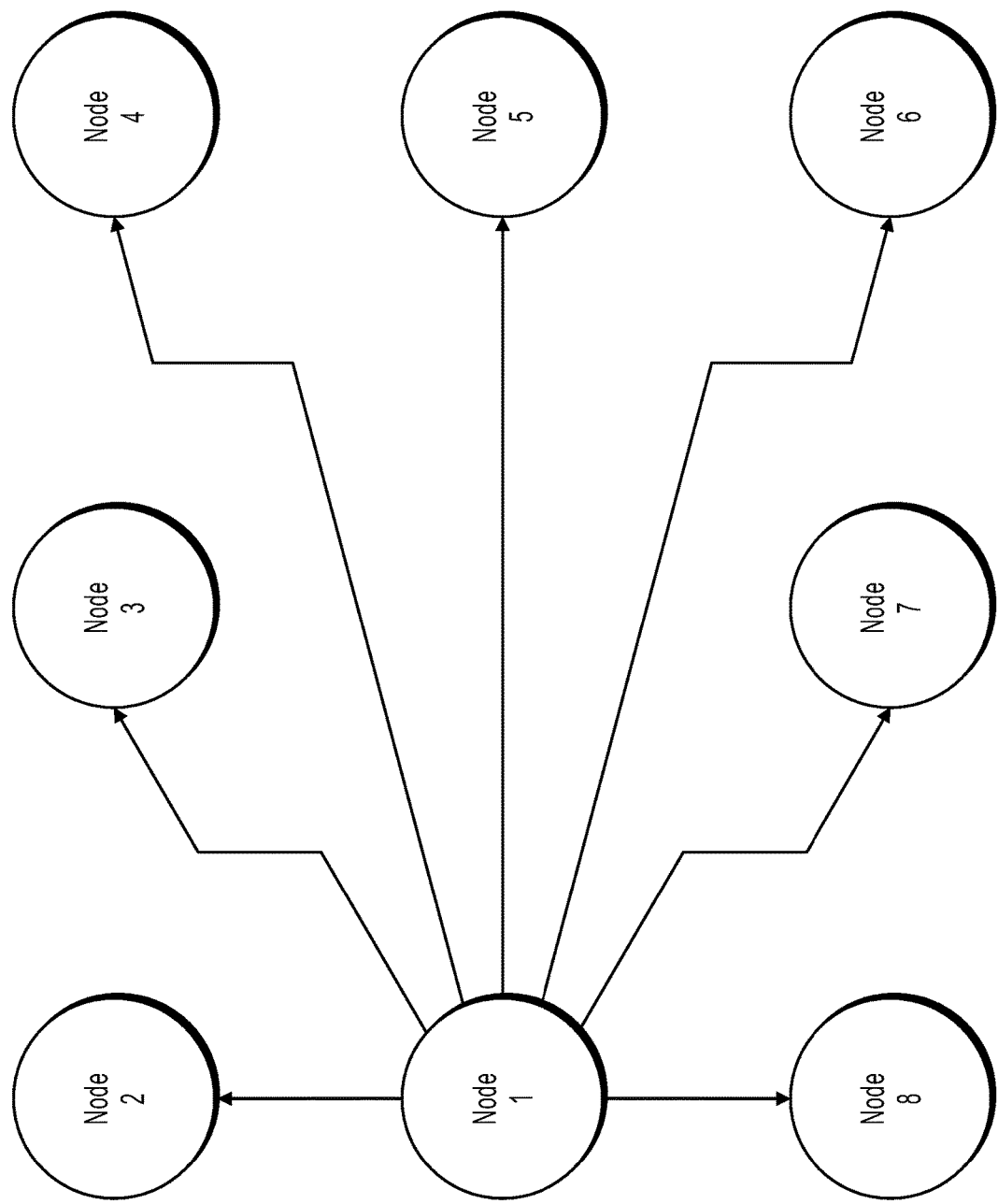
FIG. 1 is a schematic diagram illustrating a transmission path of a broadcast message in a blockchain network, according to some embodiments of the present specification.

In order to describe the technical solutions in embodiments of the present specification more clearly, the drawings needed to be used in descriptions about the embodiments will be briefly introduced below. It is clear that the drawings described below are only some examples or embodiments of the present specification, and the present specification can be applied to other similar situations based on these accompanying drawings without inventive effort for a person skilled in the art. The same reference numbers in the drawings refer to the same structure or operation unless it is obvious from the context of the language or otherwise described.

It should be understood that, the terms "system", "device", "unit" and/or "module" are used for distinguishing between different components, elements, parts, portions, or assemblies at different levels. However, if other words can achieve the same purpose, the terms can be replaced by other expressions.

As used in the present specification, the terms "a", "an", and/or "the" do not specifically refer to the singular, and can include the plural, unless the context clearly dictates otherwise. Generally, the terms "comprise" and "include" are intended to include only those steps and elements that have been specifically identified, but which do not constitute an exclusive list, and methods or devices may include other steps and elements.

FIG. 1 is a schematic diagram illustrating a transmission path of a broadcast message in a blockchain network, according to some embodiments of the present specification.

P2P that has a full name of peer-to-peer network and is also known as point-to-point technology, is an internet system that does not have a central server and relies on peers to exchange information. Unlike a central network system having a central server, each user device of the peer-to-peer network is a node and can function as a server. A central server means that, when attacked, once the central server goes down, the entire network and services will become problematic. The P2P network has the advantage that each node is both a client device and a server, so when attacked, any machine going down does not affect the overall service. The core of blockchain is decentralization, which is the same as the concept of the P2P network, so the blockchain network generally uses P2P as the bottom layer implementation, and most public blockchain networks (public blockchain) and consortium blockchain networks (consortium blockchain) use similar bottom layer implementation.

In the blockchain network, the underlying P2P network can include one or more P2P nodes, and such a P2P node also typically is a node in the blockchain network, for example, a node 1 to a node 8 in FIG. 1. As shown in FIG. 1, node 1 needs to transmit 7 repeated messages when broadcasting one message in a blockchain network, and each message is transmitted to one of other 7 nodes. As more nodes join the blockchain network, the number of messages needed to be transmitted also increases each time after the node in the blockchain network broadcasts a message, and the occupation of an uplink bandwidth and a cross-regional bandwidth by the blockchain node also increase.

As a kind of blockchain, a consortium blockchain often uses a Practical Byzantine Fault Tolerance (PBFT) algorithm or a similar consensus algorithm to cause nodes to reach a consensus. Consensus nodes need to broadcast a large number of messages. If each consensus node transmits broadcast messages through a direct connection with another consensus node, the previous bandwidth occupation problem is more severe. In some scenarios, the consortium blockchain has high security requirements, the consortium node needs to set an IP white list, and when a new consortium node joins the consortium blockchain, each consortium node needs to update its own IP white list so as to ensure that the nodes in the consortium blockchain can directly communicate with each other. Taking FIG. 1 as an example, the node 1 to the node 8 belong to the same consortium blockchain, and assume that a consortium node 8 is a newly joined node, to ensure that the nodes in the consortium blockchain can directly communicate with each other, a consortium node 1 to a consortium node 7 respectively need to add an IP of the consortium node 8 into their respective IP white lists, and the consortium node 8 needs to add IPs of the consortium node 1 to the consortium node 7 into its IP white list.

Figure 2:
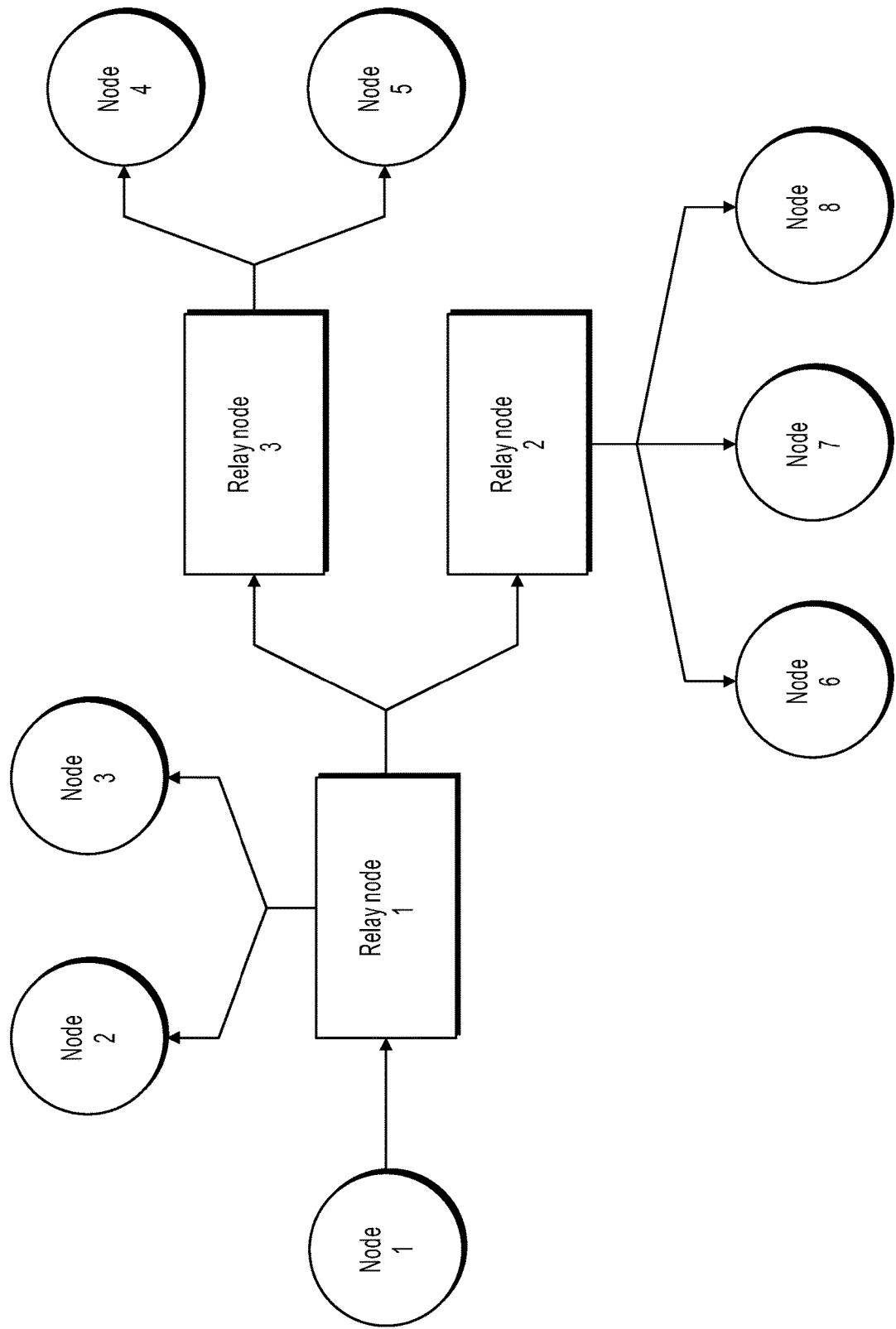
FIG. 2 is a schematic diagram illustrating a transmission path of a broadcast message after a blockchain node is connected to a relay node, according to some embodiments of the present specification.

FIG. 2 is a schematic diagram illustrating a transmission path of a broadcast message after a blockchain node is connected to a relay node, according to some embodiments of the present specification.

In some embodiments, any blockchain node can establish a connection with at least one relay node. For the same broadcast message, the blockchain node needs only transmit one broadcast message to the connected relay node, and only one broadcast message needs to be forwarded between the relay nodes, so the occupation of the uplink bandwidth and the cross-regional bandwidth by the blockchain node can be greatly reduced. For example, as shown in FIG. 2, a node 1 to a node 8 belong to the same blockchain network. Assume that the node 1 needs to broadcast one message, the node 1 can transmit one broadcast message to a connected relay node 1. The relay node 1 respectively transmits one broadcast message to connected node 2 and node 3 after receiving the broadcast message, and respectively transmits one broadcast message to a relay node 2 and a relay node 3. The relay node 2 respectively transmits one broadcast message to connected node 6, node 7 and node 8 after receiving the broadcast message. The relay node 3 respectively transmits one broadcast message to connected node 4 and node 5 after receiving the broadcast message.

With regard to the consortium blockchain, since a consortium node can transmit a message to another consortium node through a relay node after being connected to the relay node, that is, the consortium node directly communicates with the relay node, and the consortium node can add an IP of the relay node in an IP white list. That is, as long as the IP of the connected relay node is added into the IP white list of the consortium node, the consortium node does not need to update the IP white list to communicate with a newly joined consortium node that is connected to the relay node or another relay node. Taking FIG. 2 as an example, the node 1 to the node 8 belong to the same consortium blockchain, and the consortium node 1 can add an IP of the relay node 1 into an IP white list, so the consortium node 1 can communicate with another consortium node by transmitting a message to the relay node 1 no matter how many nodes newly join the consortium blockchain.

The composition and workflow of a communication optimization system including the relay node will be described in detail with reference to FIG. 3 to FIG. 6.

Figure 3:
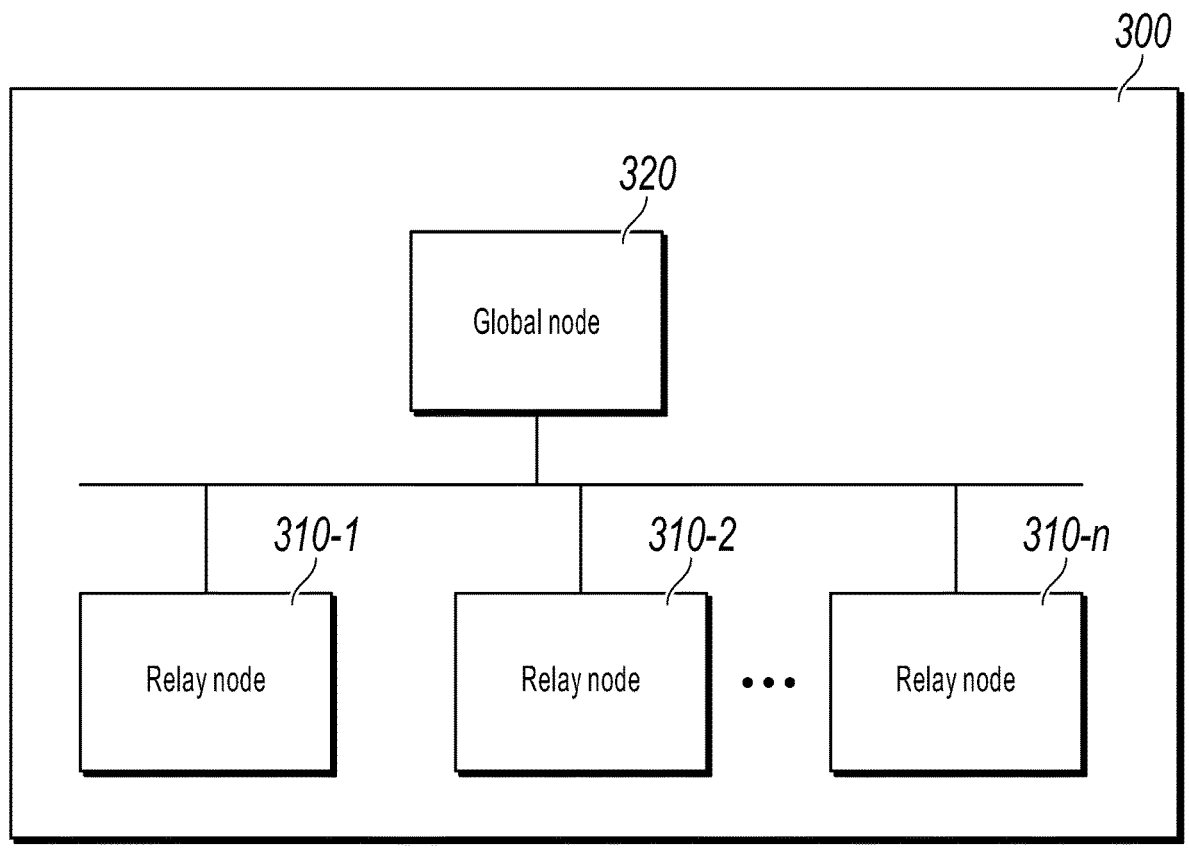
FIG. 3 is an example block diagram illustrating a communication optimization system of a blockchain network, according to some embodiments of the present specification.

FIG. 3 is an example block diagram illustrating a communication optimization system of a blockchain network, according to some embodiments of the present specification. As shown in FIG. 3, a system 300 can include two or more relay nodes (e.g. a node 310-1, a node 310-2, . . . , and a node 310-n) and a global node 320.

The relay node can have an IP (short for IP address) exposed to an outside of the system 300 such that a blockchain node establishes a connection with the relay node based on the IP. Specifically, the blockchain node can initiate a connection request including the IP of the relay node such that the relay node establishes a connection with the blockchain node in response to the connection request. In some embodiments, the blockchain node can establish a persistent connection with the relay node through the IP of the relay node. The persistent connection can remain open for multiple transactions. A heartbeat mechanism can be used for two devices that establish a persistent connection with each other to determine whether the other device remains "alive", and false connections can be eliminated periodically to achieve the purpose of connection reuse.

In some embodiments, the relay node can have a group of (at least two) IPs exposed to the outside of the system 300 for disaster recovery. Specifically, the blockchain node can first establish a connection with the relay node based on any IP in the group of IPs, and can switch to another IP in the group of IPs to establish a connection with the relay node when identifying that the communication based on any IP fails (e.g. no message can be transmitted, no reply is received after transmitting a message to the other party, etc.).

The blockchain node can select a nearby relay node to establish a connection for better quality of service (QoS). For example, at least one relay node can be provided in a single physical region based on the division of physical regions, and specifically, one city/country/region/continent can be taken as one physical region. For example, two relay nodes can be provided in a single city in China, and any blockchain node located in the city can select one of the relay nodes to be a main relay node and the other relay node to be a standby relay node. For another example, two relay nodes can be provided in Europe, and any blockchain node located in Europe can select one of the relay nodes to be a main relay node and the other relay node to be a standby relay node. For more details about the main/standby relay nodes, reference can be made to the following related description.

The blockchain node can initiate a registration request to the relay node after establishing a connection with the relay node, and the registration request can include an ID of the blockchain node and an ID of the relay node connected to the blockchain node. The relay node can generate a registration event based on the registration request after receiving the registration request and transmit the registration event to the global node 320. The registration event can include the ID of the blockchain node and the ID of the relay node connected to the blockchain node.

The blockchain node can communicate with the relay node over a public network. For privacy protection, a message body in a message transmitted by the blockchain node to the relay node can be encrypted.

The global node 320 can be configured to transmit a registration event of any relay node to another relay node.

The relay node (a node 310-i can be taken as an example) can update a local routing table based on the obtained registration event. The local routing table includes a corresponding relationship between the ID of the blockchain node and the ID of the relay node connected to the blockchain node for indicating a connection relationship between the blockchain node and the relay node, so the relay node 310-i can forward a message of the blockchain node based on the local routing table. It should be understood that the updating of the local routing table of the relay node 310-i includes two types, one is updating of the local routing table based on an own received registration request or an own generated registration event of the relay node 310-i, and the other is updating of the local routing table based on a registration event of another relay node 310-j (j≠I) received from the global node 320. In addition, the local routing tables of all relay nodes within the system 300 can remain consistent (synchronized) after updating.

For a unicast message including an ID of a destination blockchain node, a relay node (the node 310-i can be taken as an example) can search for a corresponding relationship including the ID of the destination blockchain node in the local routing table, and an ID of a relay node corresponding to the ID of the destination blockchain node is an ID of a relay node connected to the destination blockchain node. Further, the relay node 310-i can determine whether the relay node (may be denoted as a node 310-j) connected to the destination blockchain node is a current relay node. If yes (i.e. j=i), the unicast message is forwarded to the destination blockchain node. Otherwise (i.e. j≠i), the relay node 310-i forwards the unicast message to the relay node 310-j connected to the destination blockchain node, and the relay node 310-j can identify that the ID of the relay node corresponding to the ID of the destination blockchain node is an ID of the relay node 310-j (i.e. an ID of the current relay node) by querying the local routing table after receiving the unicast message including the ID of the destination blockchain node, it indicates that the destination blockchain node is connected to the current relay node, and then the relay node 310-j can transmit the unicast message to the destination blockchain node.

Figure 4:
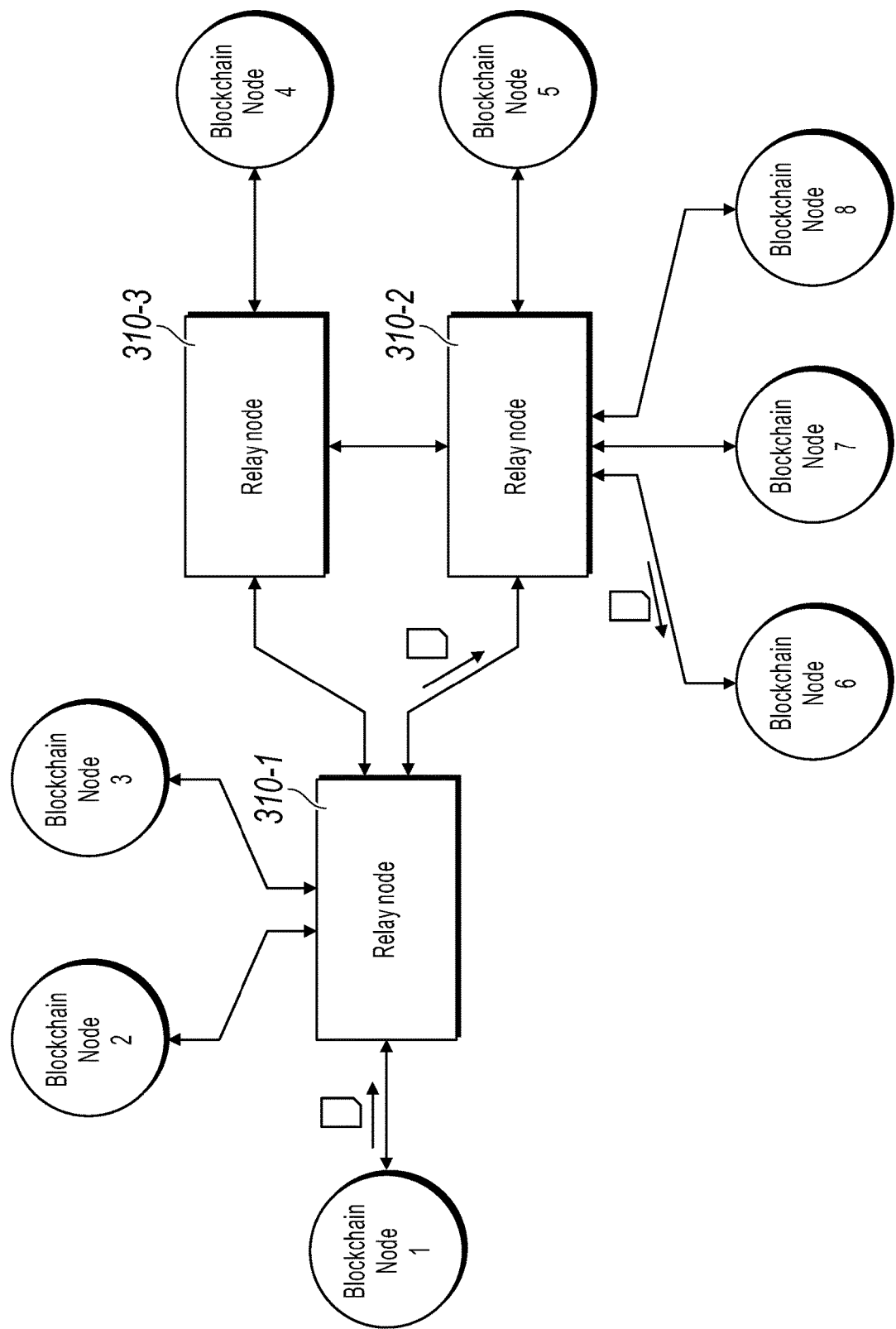
FIG. 4 is a schematic diagram illustrating a message transmission path for forwarding a unicast message by a relay node, according to some embodiments of the present specification.

Illustration will be made below by taking an example in conjunction with FIG. 4. In FIG. 4, a blockchain node 1 wants to transmit a unicast message to a blockchain node 6; the blockchain node 1 is connected to a relay node 310-1; the blockchain node 6 is connected to a relay node 310-2; the relay node 310-1 can search for an ID of a relay node corresponding to an ID of the blockchain node 6 based on a local routing table after receiving a unicast message including the ID of the blockchain node 6, an ID of the relay node 310-2 is obtained, it indicates that the blockchain node 6 is connected to the relay node 310-2, and then the relay node 310-1 transmits the unicast message to the relay node 310-2. The relay node 310-2 can search for the ID of the relay node corresponding to the ID of the blockchain node 6 based on the local routing table after receiving the unicast message including the ID of the blockchain node 6, an ID of a current relay node (the relay node 310-2) is obtained, it indicates that the blockchain node 6 is connected to the current relay node, and then the relay node 310-2 transmits the unicast message to the connected blockchain node 6.

For a broadcast message, both single-chain and multi-chain scenarios can be further discussed.

For single-chain, blockchain nodes connected to relay nodes within the system 300 belong to the same blockchain network. On the one hand, a relay node 310-i can respectively transmit one broadcast message to each blockchain node (excluding a blockchain node that transmits the broadcast message) connected to the current relay node after receiving a broadcast message of a blockchain node. On the other hand, the relay node 310-i can transmit one broadcast message to another relay node 310-j, and the relay node 310-j can respectively transmit one broadcast message to each blockchain node connected to the current relay node (excluding the blockchain node that transmits the broadcast message) after receiving the broadcast message.

Figure 5:
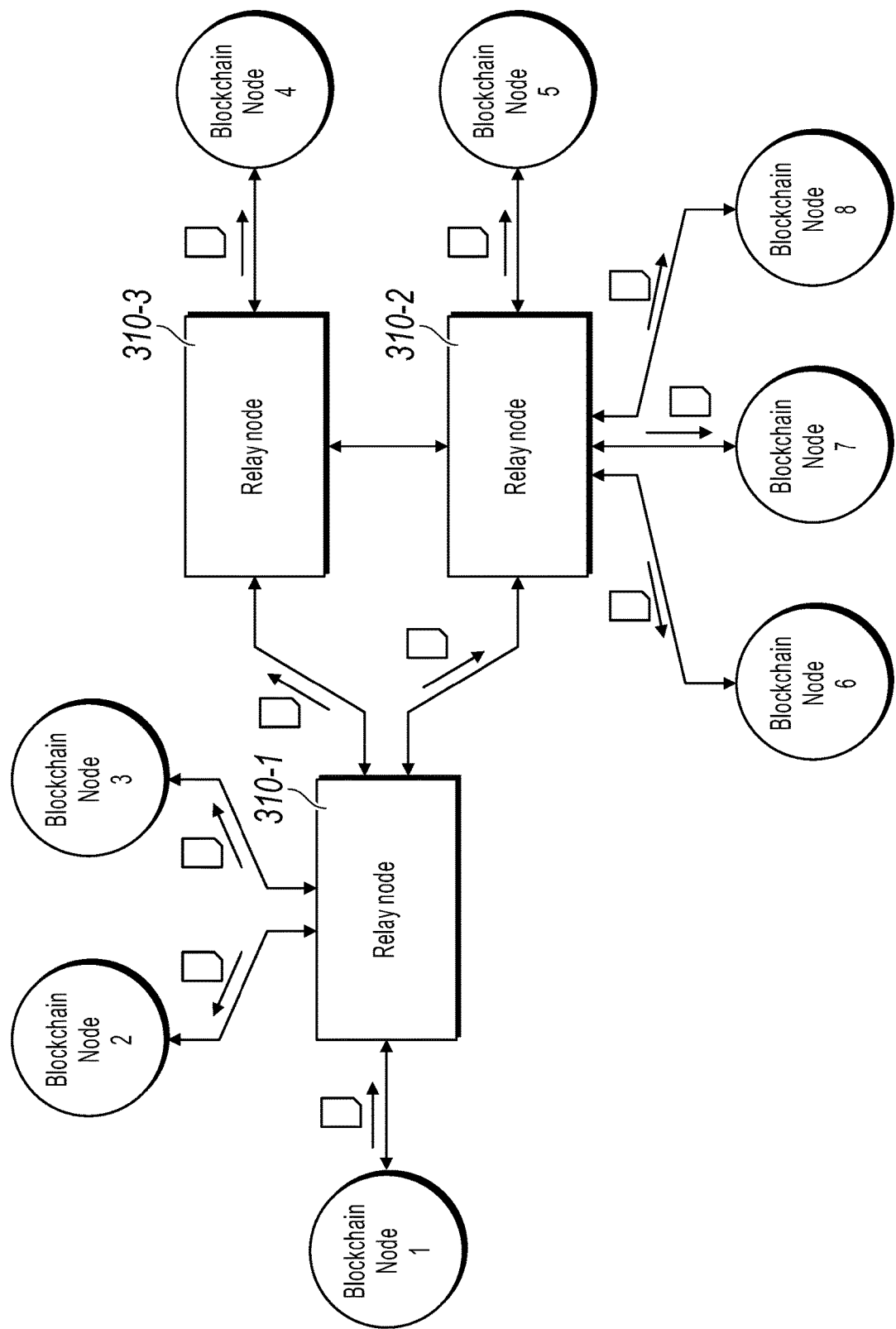
FIG. 5 is a schematic diagram illustrating a message transmission path for forwarding a broadcast message by a relay node in a single-chain scenario, according to some embodiments of the present specification.

Illustration will be made below by taking an example in conjunction with FIG. 5. In FIG. 5, blockchain nodes connected to the system 300 belong to the same blockchain network. On the one hand, a relay node 310-1 can respectively transmit one broadcast message to each blockchain node (excluding a blockchain node 1 that transmits the broadcast message), i.e. a blockchain node 2 and a blockchain node 3, connected to the current relay node after receiving the broadcast message of the blockchain node 1. On the other hand, the relay node 310-1 can respectively transmit one broadcast message to a relay node 310-2 and a relay node 310-3. Similarly, the relay node 310-2 can respectively transmit one broadcast message to each blockchain node, i.e. a blockchain node 5, a blockchain node 6, a blockchain node 7, and a blockchain node 8, connected to the current relay node after receiving the broadcast message. The relay node 310-3 can transmit one broadcast message to a blockchain node 4 connected to the current relay node after receiving the broadcast message.

For multi-chain, blockchain nodes connected to the relay nodes within the system 300 can belong to different blockchain networks, so it is necessary to distinguish the blockchain networks that include the blockchain nodes through IDs of the blockchain networks. Specifically, a registration request initiated by a blockchain node includes not only an ID of the blockchain node, but also an ID of a blockchain network that includes the blockchain node. Accordingly, a registration event obtained by the relay node includes not only the ID of the blockchain node, but also the ID of the blockchain network that includes the blockchain node. In addition, a local routing table of a relay node can includes two parts, one part can be referred to as a unicast routing table and the other part can be referred to as a broadcast routing table, the unicast routing table can include an ID of a blockchain node and an ID of a relay node connected to the blockchain node, and the broadcast routing table can include an ID of a blockchain network, and an ID of a blockchain node in the blockchain network, and an ID of a relay node connected to the blockchain node in the blockchain network.

A relay node 310-i can search for a corresponding relationship (hereinafter referred to as a target corresponding relationship) including an ID of a destination blockchain network in the local routing table after receiving a broadcast message including the ID of the destination blockchain network. On the one hand, the relay node 310-i can check whether any identified target corresponding relationship includes an ID of a current relay node. If yes, the relay node 310-i can determine an ID of a blockchain node connected to the current relay node in the destination blockchain network from the target corresponding relationship, and then transmit one broadcast message to the blockchain node corresponding to the ID. On the other hand, the relay node 310-i can check whether the target corresponding relationship includes an ID of another relay node (denoted as a node 310-j, where j≠i). If yes, the relay node 310-i can transmit one broadcast message to the another relay node 310-j. The relay node 310-j can search for a corresponding relationship including the ID of the destination blockchain network and the ID of the current relay node (the relay node 310-j) in the local routing table after receiving the broadcast message including the ID of the destination blockchain network, and then transmit one broadcast message to each blockchain node connected to the relay node 310-j and included in the destination blockchain network based on an ID of a blockchain node (denoted as a blockchain node connected to the relay node 310-j in the destination blockchain network) in each identified corresponding relationship including the ID of the destination blockchain network and the ID of the current relay node (the relay node 310-j).

Figure 6:
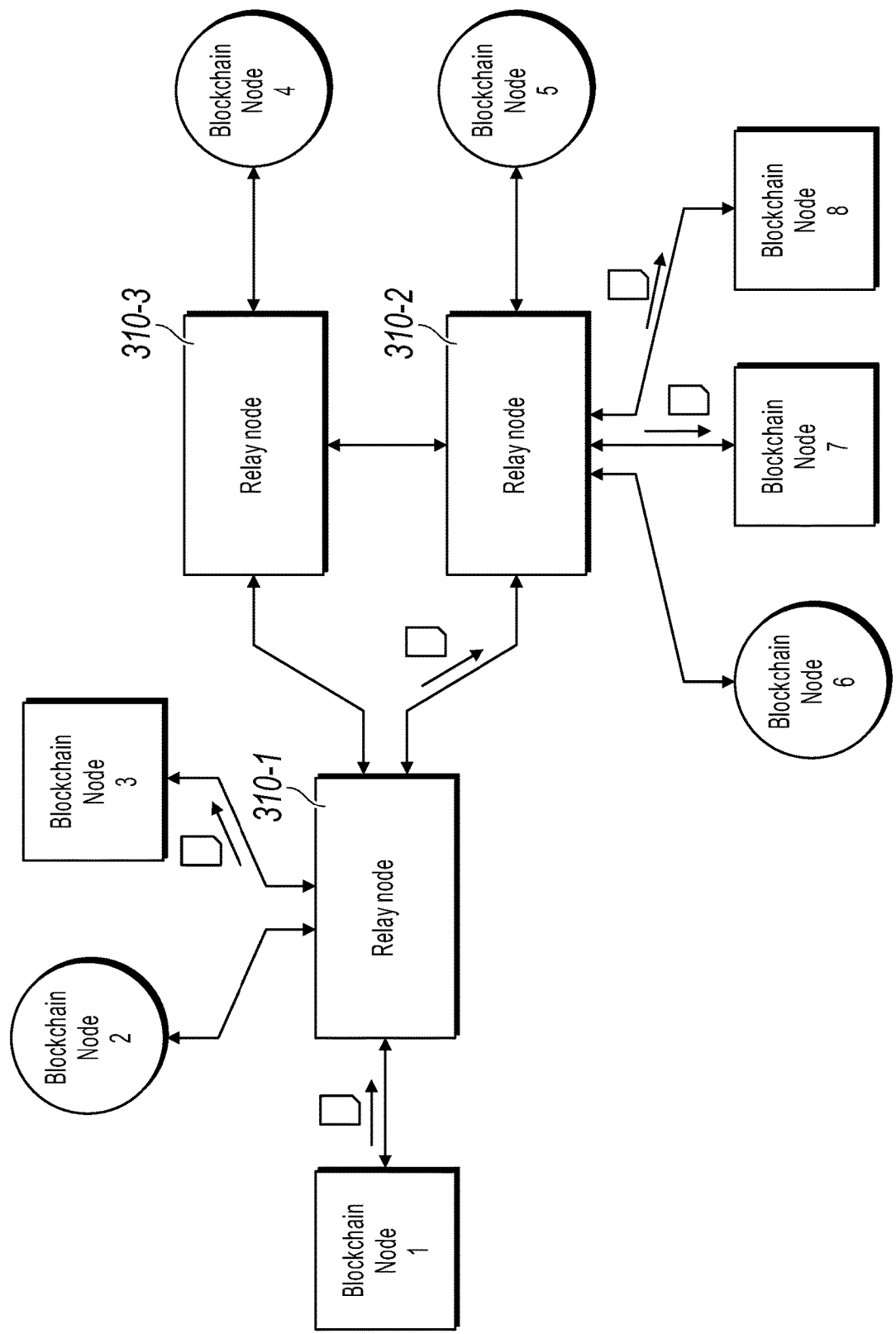
FIG. 6 is a schematic diagram illustrating a message transmission path for forwarding a broadcast message by a relay node in a multi-chain scenario, according to some embodiments of the present specification.

Illustration will be made below by taking an example in conjunction with FIG. 6. A blockchain node 1, a blockchain node 3, a blockchain node 7, and a blockchain node 8 belong to the same blockchain network, and a blockchain node 2, a blockchain node 4, a blockchain node 5, and a blockchain node 6 belong to another blockchain network. As shown in FIG. 6, the blockchain node 1 transmits one broadcast message including an ID of a blockchain network that includes the blockchain node 1 to a relay node 310-1, and the ID of the blockchain network that includes the blockchain node 1 is an ID of a destination blockchain network. The relay node 310-1 can search for a target corresponding relationship including the ID of the destination blockchain network in a local routing table after receiving the broadcast message of the blockchain node 1. On the one hand, the relay node 310-1 can check that the target corresponding relationship include an ID of a current relay node (the relay node 310-1), the relay node 310-1 can further determine an ID of a blockchain node (the blockchain node 3) connected to the current relay node in the destination blockchain network, and then transmit one broadcast message to the blockchain node 3. On the other hand, the relay node 310-1 can check that the target corresponding relationship include an ID of another relay node (i.e. a relay node 310-2), and the relay node 310-1 can transmit one broadcast message to the relay node 310-2. Similarly, the relay node 310-2 can check that the target corresponding relationships include the ID of the current relay node (the relay node 310-2) after receiving the broadcast message, the relay node 310-2 can further determine the ID of the blockchain node (the blockchain node 7 and the blockchain node 8) connected to the current relay node in the destination blockchain network, and then respectively transmit one broadcast message to the blockchain node 7 and the blockchain node 8.

It is worthwhile to note that a port configured to transmit a message between a blockchain node and a relay node and a port configured to transmit a message between relay nodes can be different, so any relay node can distinguish whether a received message is transmitted by the blockchain node (not forwarded by another relay node) or forwarded by another relay node based on the different ports. Based on this, any relay node may not repeatedly forward the received broadcast message again to another relay node when determining that the received broadcast message is forwarded by the another relay node.

Since the system 300 can be uniformly deployed by a neutral party (relative to the blockchain nodes), connections can be established between devices within the system 300 through Intranet (an internal network of an enterprise or institution, i.e. intranet). As such, a message of the blockchain node transmitted between the relay nodes within the system 300 can obtain a lower transmission latency. It is worthwhile to note that for two blockchain nodes that are physically distant, referring to the previously described that the blockchain node can select a nearby relay node to connect, it can be seen that a distance between (two) relay nodes connected to the two blockchain nodes is usually much farther than a distance between any blockchain node and a connected relay node. Therefore, the time for transmitting broadcast messages between the blockchain nodes will be greatly reduced by establishing a connection between the relay nodes through the intranet and transmitting only one broadcast message.

In some embodiments, a persistent connection can be established between the relay nodes within the system 300, for example, a persistent connected can be established through an IP of the intranet. In some embodiments, a persistent connection can also be established between the relay node and the global node 320 within the system 300, for example, a persistent connection can be established through the IP of the intranet.

With regard to the consortium blockchain, a registration request transmitted by a consortium node to a connected relay node can be transmitted by the relay node to other consortium nodes connected to the relay node, and the relay node and the other consortium nodes (belonging to the same consortium blockchain as the consortium node) connected to the relay node can respectively verify the registration request. If the relay node passes the verification of the registration request and more than a predetermined proportion of other consortium nodes (belonging to the same consortium blockchain as the consortium node) connected to the relay node pass the verification of the registration request, it can be considered that the consortium node "formally" accesses the system 300, and each relay node within the system 300 will update a corresponding relationship associated with the consortium node to a local routing table. If the verification fails, the system 300 will not provide communication optimization services for the consortium node, that is, each relay node within the system 300 will not update the corresponding relationship associated with the consortium node to the local routing table.

In some embodiments, a blockchain node can select two relay nodes to access the system 300, one is a main relay node and the other is a standby relay node. Specifically, for each of the two relay nodes, a registration request initiated by the blockchain node to the relay node includes not only an ID of the blockchain node and an ID of the relay node, but also a main/standby identifier of the relay node for indicating that the relay node is the main/standby relay node of the blockchain node. Accordingly, a registration event generated based on the registration request can also include the main/standby identifier of the relay node connected to the blockchain node, and a local routing table of any relay node can include a corresponding relationship among the ID of the blockchain node, the ID of the relay node connected to the blockchain node, and the main/standby identifier of the relay node connected to the blockchain node, as such any relay node can distinguish between the main relay node and the standby relay node of the blockchain node based on the local routing table. It can be understood that the standby relay node of the blockchain node is configured to receive a message transmitted by the blockchain node or a message transmitted to the blockchain node when the main relay node of the blockchain node fails.

For example, a blockchain node that transmits a message (can be referred to as a source blockchain node) can switch to a connection with a standby relay node when determining that a main relay node of the blockchain node fails (e.g. a message cannot be transmitted, or no response is received after a message is transmitted to the main relay node), and transmit the message to the standby relay node, that is, the source blockchain node can transmit the message through the standby relay node of the source blockchain node. For another example, a relay node connected to the source blockchain node can switch to a connection with a standby relay node of a destination blockchain node when determining that a main relay node of the destination blockchain node fails (e.g. a message cannot be transmitted, or no response is received after a message is transmitted to the main relay node of the destination blockchain node), and forward the message to the standby relay node of the destination blockchain node, that is, the relay node connected to the source blockchain node transmits the message through the standby relay node of the destination blockchain node.

In some embodiments, the blockchain node can also initiate a deregistration request to the connected relay node, where the deregistration request can include the ID of the blockchain node. The relay node can generate a deregistration event based on the deregistration request after receiving the deregistration request, and transmit the deregistration event to the global node 320, where the deregistration event can include the ID of the blockchain node. Accordingly, the global node 320 can transmit a deregistration event of any relay node to another relay node. The relay node can update the local routing table based on the received deregistration request or the deregistration event. It can be understood that in contrast to "registration", "deregistration" means that a blockchain node is disconnected to the system 300, and any relay node can delete a corresponding relationship including an ID of the blockchain node from the local routing table after receiving the deregistration request or deregistration event including the ID of the blockchain node.

In the present specification, the corresponding relationships and/or events can be saved in the form of a key-value pair in the local routing table. For example, a unicast routing table/registration event can include a key pair taking an ID of a blockchain node as a key (taking information corresponding to the ID of the blockchain node as a value). For another example, a broadcast routing table can include a key pair taking an ID of a blockchain network as a key (taking information corresponding to the ID of the blockchain node as a value).

In some embodiments, any relay node or the global node in the communication optimization system can be implemented by one subsystem, and each subsystem includes several modules having different functions to achieve load balancing. Illustration will be made below by taking an example in conjunction with FIG. 7 and FIG. 8.

Figure 7:
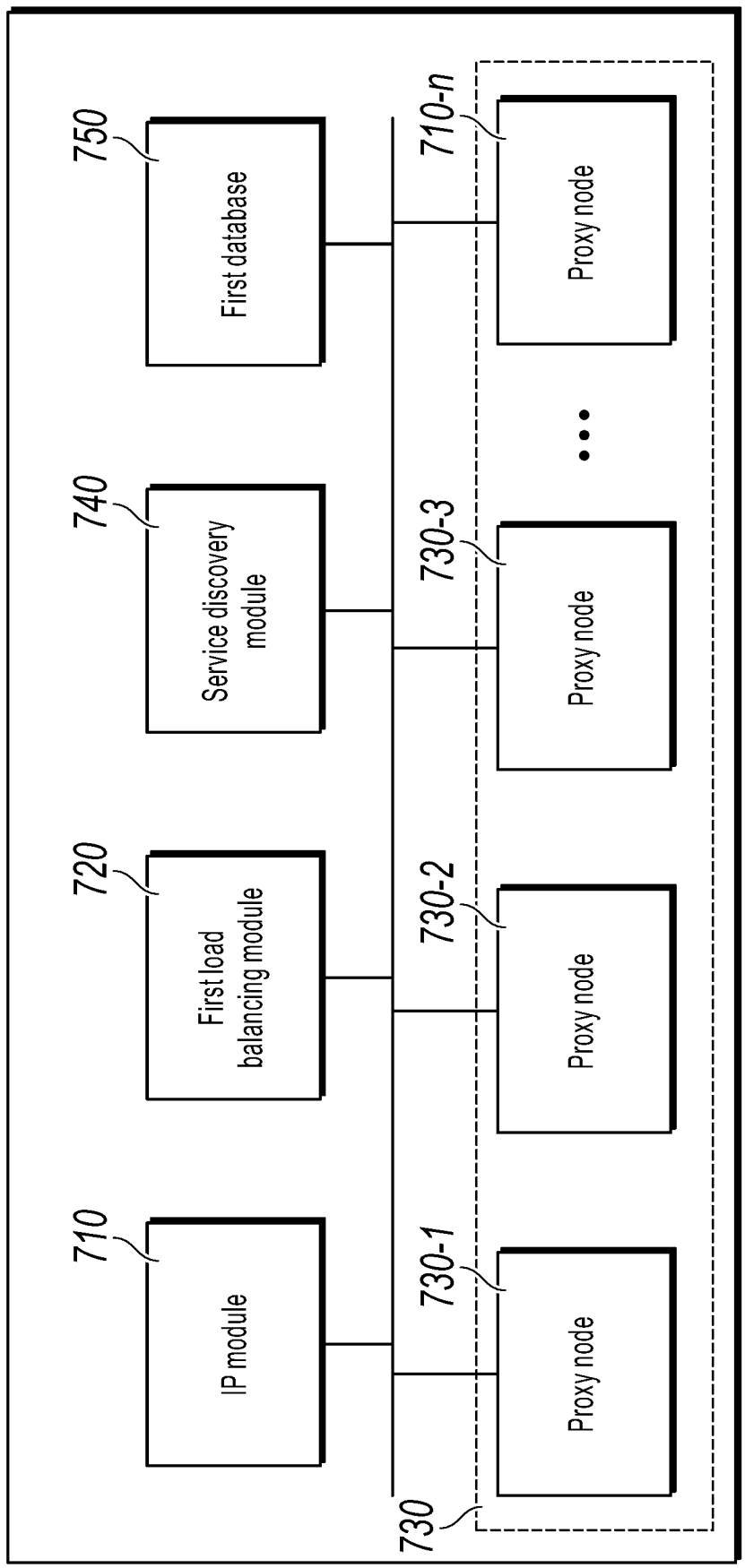
FIG. 7 is an example block diagram illustrating a relay node, according to some embodiments of the present specification.

FIG. 7 is an example block diagram illustrating a relay node, according to some embodiments of the present specification. As shown in FIG. 7, the relay node can include an IP module 710, a first load balancing module 720, a group of proxy nodes 730, a service discovery module 740, and a first database 750.

A group of proxy nodes within a single relay node are elastically scalable, that is, the number of proxy nodes within a single relay node is variable. For illustration only, the relay node in FIG. 7 includes a proxy node 730-1, a proxy node 730-2, a proxy node 730-3, . . . , and a proxy node 730-n. Generally, the number of proxy nodes within a single relay node can be consistent with the trend in the number of blockchain nodes connected to the relay node. That is, when the number of the blockchain nodes connected to the relay node increases, the number of the proxy nodes within the relay node can be appropriately increased.

An IP of the IP module 710 can be used as an IP exposed to an outside of the system 300 (that is, to the blockchain nodes) of the relay node, that is, a blockchain node can transmit a connection request including the IP of the IP module 710 to the IP module 710 of the relay node, so the IP module 710 of the relay node can establish a connection with the blockchain node in response to the connection request. The IP module 710 can receive a message of the blockchain node after establishing a connection with the blockchain node and transmit the message to the first load balancing module 720 within the relay node.

The first load balancing module 720 can be configured to transmit the registration request received from the IP module 710 within the relay node to one of the group of proxy nodes 730 within the relay node, and transmit the message received from the IP module 710 within the relay node to one of the group of proxy nodes 730 within the relay node. In some embodiments, the first load balancing module 720 can determine a proxy node 730-m from the group of proxy nodes 730 within the relay node to receive the registration request/message based on a round robin scheduling algorithm.

In some embodiments, a persistent connection can be established between the relay nodes through an IP of the first load balancing module 720. For illustration only, the IP of the first load balancing module 720 can be a virtual IP (VIP).

In some embodiments, a persistent connection can be established between proxy nodes in the same relay node through the IP of the proxy node.

Each node in the group of proxy nodes acts as a core work unit in the relay node, and has the functions of establishing a connection with a blockchain node and forwarding a message of the blockchain node based on a local routing table.

The workflow of a proxy node can refer to FIG. 8 to FIG. 11 and related descriptions about FIG. 8 to FIG. 11.

The service discovery module 740 can be configured to write a registration event received from any proxy node of a current relay node into the first database 750, and transmit a registration event generated by any proxy node of the current relay node to another proxy node of the current relay node. The service discovery module 740 of any relay node can further transmit the registration event of the current relay node to the global node 320 such that the global node 320 transmits the registration event to the service discovery modules 740 of another relay node. Accordingly, the service discovery module 740 of any relay node can receive a registration event of another relay node from the global node 320 and forward the registration event to each proxy node in the current relay node.

Figure 8:
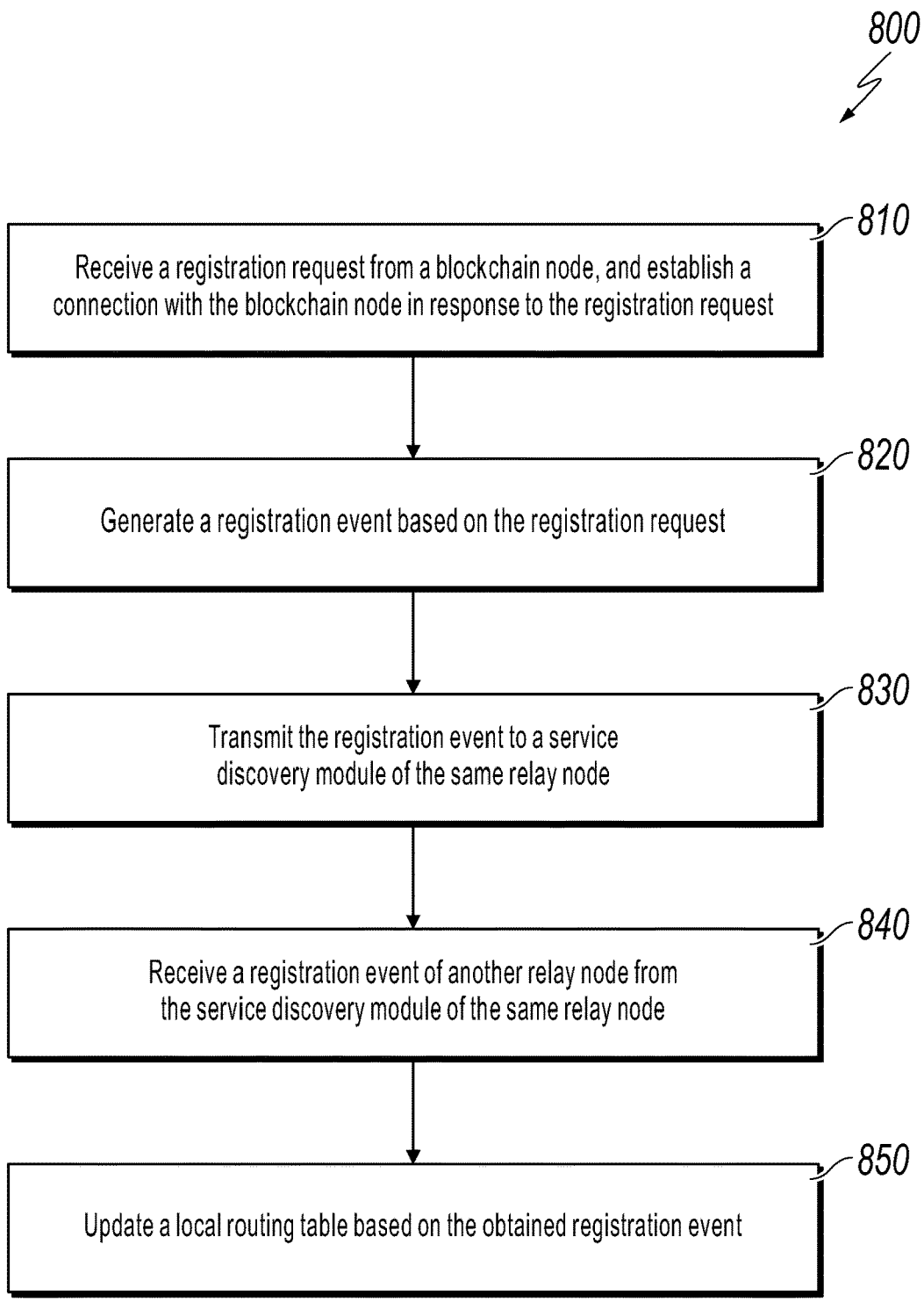
FIG. 8 is an example flowchart illustrating a registration method of a blockchain network-based communication optimization system, according to some embodiments of the present specification.

FIG. 8 is an example flowchart illustrating a registration method of a blockchain network-based communication optimization system, according to some embodiments of the present specification. For ease of description, a subject performing a process 800 can be denoted as a proxy node 730-$m$ in a relay node 310-$i$, and it should be understood that another proxy node 730-$j$ ($j\neq i$) within the relay node 310-$i$, as well as a proxy node in another relay node 310-$j$ ($j\neq i$) within the system 300 can update a local routing tables by referring to the process 800. As shown in FIG. 8, the process 800 can include:

At step 810, a registration request of a blockchain node is received, and a connection with the blockchain node is established in response to the registration request.

In some embodiments, the proxy node can establish a persistent connection with the blockchain node.

At step 820, a registration event is generated based on the registration request.

Since the proxy node is responsible for forwarding a message, the registration event can include not only an ID of the blockchain node, an ID of a relay node connected to the blockchain node, but also an IP of a proxy node connected to the blockchain node; accordingly, the local routing table can include not only a corresponding relationship between the ID of the blockchain node and the ID of the relay node connected to the blockchain node, but also a corresponding relationship between the ID of the blockchain node and the IP of the proxy node connected to the blockchain node, so the proxy node can determine whether a proxy node connected to a blockchain node for receiving the message is a current proxy node. The proxy node can transmit the message to the blockchain node for receiving the message after determining that the proxy node connected to the blockchain node for receiving the message is the current proxy node. The proxy node can transmit the message to the proxy node connected to the blockchain node for receiving the message based on the IP after determining that the proxy node connected to the blockchain node for receiving the message is not the current proxy node.

At step 830, the registration event is transmitted to a service discovery module of the same relay node.

The service discovery module 740 in the relay node 310-$i$ can transmit the registration event to another proxy node 730-$n$ ($n\neq m$) in the relay node 310-$i$ after receiving the registration event generated by the proxy node 730-$m$ of the relay node 310-$i$ based on the registration request. As such, each proxy node within any relay node can update a local routing table based on a registration event generated by a current proxy node or a registration event generated by another proxy node in a current relay node.

At step 840, a registration event of another relay node is received from the service discovery module of the same relay node.

The service discovery module 740 in the relay node 310-$i$ can further transmit the registration event of the current relay node to the global node 320 after receiving the registration event of the current relay node. The global node 320 can transmit the registration event of the relay node 310-$i$ to the service discovery module 740 of the another relay node 310-$j$ ($j\neq i$) within the system 300 after receiving the registration event of relay node 310-$i$. The service discovery module 740 of the relay node 310-$j$ can transmit a registration event of the another relay node 310-$i$ to each proxy node in the relay node 310-$j$ after receiving the registration event of the another relay node 310-$i$. Similarly, each proxy node within the relay node 310-$i$ can also receive the registration event of the another relay node 310-$j$ ($j\neq i$) from the service discovery module 740 of the relay node 310-$i$. That is, each proxy node within any relay node can obtain a registration event of another relay node and update a local routing table based on the registration event of the another relay node.

At step 850, a local routing table is updated based on the obtained registration event.

It can be understood that, taking the proxy node 730-$m$ of the relay node 310-$i$ as an example, registration events obtained by the proxy node 730-$m$ of the relay node 310-$i$ can include a registration event generated by a current proxy node (i.e. the proxy node 730-$m$), a registration event (that is, of a current relay node) generated by the another proxy node 730-$n$ ($n\neq m$) in the relay node 310-$i$, and a registration event (that is, of another relay node) generated by a proxy node in the another relay node 310-$j$ ($j\neq i$) within the system 300. The local routing tables of all proxy node within the system 300 can remain consistent (synchronized) after updating.

For multiple-chain, the registration request can include an ID of a blockchain node, an ID of a blockchain network that includes the blockchain node, and an ID of a relay node connected to the blockchain node. Accordingly, the registration event can include the ID of the blockchain node, the ID of the blockchain network that includes the blockchain node, an IP of a proxy node connected to the blockchain node, and the ID of the relay node connected to the blockchain node. A local routing table of each proxy node can includes two parts, i.e. a unicast routing table and a broadcast routing table; the unicast routing table can include a corresponding relationship among an ID of a blockchain node, an IP of a proxy node connected to the blockchain node, and an ID of a relay node connected to the blockchain node; and the broadcast routing table includes a corresponding relationship among an ID of a blockchain network, an ID of a blockchain node in the blockchain network, an IP of a proxy node connected to the blockchain node in the blockchain network, and an ID of a relay node connected to the blockchain node in the blockchain network.

Figure 9:
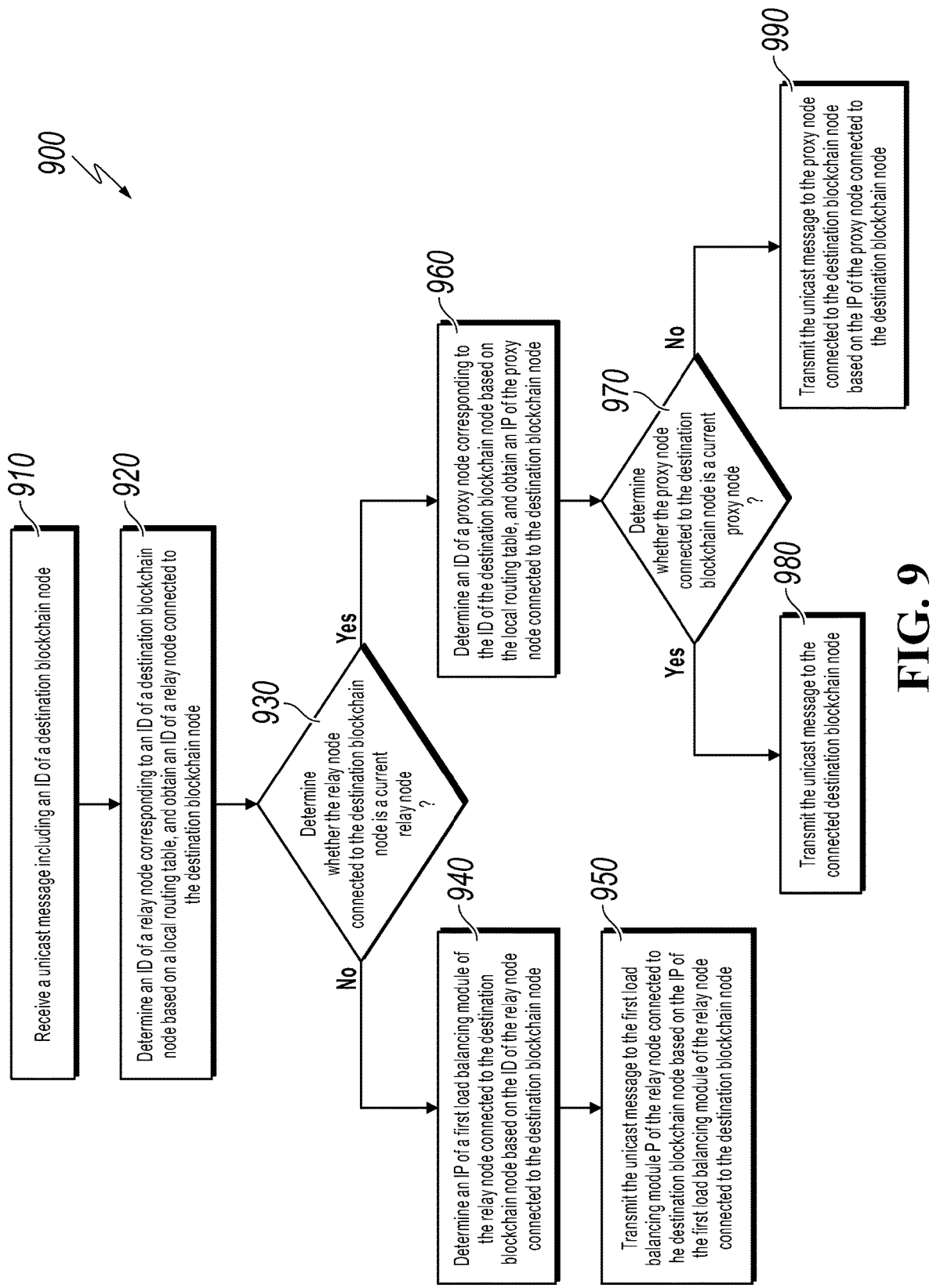
FIG. 9 is an example flowchart illustrating forwarding of a unicast message by a proxy node, according to some embodiments of the present specification.

FIG. 9 is an example flowchart illustrating forwarding of a unicast message by a proxy node, according to some embodiments of the present specification. For ease of description, a subject performing a process 900 can be denoted as a proxy node 730-*m* in a relay node 310-*i*, and it should be understood that another proxy node 730-*j* (j≠i) in the relay node 310-*i*, as well as a proxy node in another relay node 310-*j* (j≠i) within the system 300 can forward a message by referring to the process 900. As shown in FIG. 9, the process 900 can include:

At step 910, a unicast message including an ID of a destination blockchain node is received.

A blockchain node connected to the relay node 310-*i* first transmits a unicast message to the IP module 710 of the relay node 310-*i*, and the IP module 710 of the relay node 310-*i* then transmits a broadcast message to the first load balancing module 720 of the relay node 310-*i*, further, the first load balancing module 720 of the relay node 310-*i* can transmit the broadcast message to a certain proxy node (denoted as the proxy node 730-*m*) in the relay node 310-*i*.

At step 920, an ID of a relay node corresponding to the ID of the destination blockchain node is determined based on a local routing table, and the ID of the relay node connected to the destination blockchain node is obtained.

At step 930, whether the relay node connected to the destination blockchain node is a current relay node is determined.

For proxy nodes in the relay node 310-*i*, the current relay node is the relay node 310-*i*. It can be understood that any proxy node can save an ID of the current relay node, so whether the relay node connected to the destination blockchain node is the current relay node can be determined by comparing the ID of the relay node connected to the destination blockchain node with the ID of the current relay node.

If no, step 940 is performed. If yes, step 960 is performed.

At step 940, an IP of a first load balancing module of the relay node connected to the destination blockchain node is determined based on the ID of the relay node connected to the destination blockchain node.

At step 950, the unicast message is transmitted to the first load balancing module of the relay node connected to the destination blockchain node based on the IP of the first load balancing module of the relay node connected to the destination blockchain node.

The proxy node 730-*m* of the relay node 310-*i* can search for an IP of a first load balancing module corresponding to an ID of the relay node 310-*j* when determining that the destination blockchain node is connected to another relay node (can be denoted as the relay node 310-*j*, where j≠i) within the system 300, obtain the IP of the first load balancing module in the relay node 310-*j*, and then transmit the unicast message to the first load balancing module in the relay node 310-*j* based on the IP of the first load balancing module in the relay node 310-*j*.

It can be understood that a proxy node of each relay node can store a corresponding relationship between an ID of another relay node and an IP of a first load balancing module of the another relay node to determine the IP of the first load balancing module of the another relay node based on the ID of the another relay node. For example, the proxy node of the relay node 310-*i* can store a correspondence between the ID of the relay node 310-*j* (j≠i) and the IP of the first load balancing module of the relay node 310-*j* to determine the IP of the first load balancing module of the relay node 310-*j* based on the ID of the relay node 310-*j*.

The first load balancing module in the relay node 310-*j* can transmit the unicast message to a certain proxy node in the relay node 310-*j* after receiving the unicast message, and the proxy node can forward the unicast message by referring to the process 900. It can be understood that a proxy node in relay node 310-*j* that first receives the unicast message will continue to perform step 960 after performing step 920 and step 930.

Of course, the proxy node in the relay node 310-*j* that first receives the unicast message can also skip step 920 to directly perform step 960. It can be understood that the proxy node that receives the unicast message can determine whether step 920 needs to be skipped in a certain way. For example, a port configured to transmit a message by a blockchain node and a port configured to transmit a message by a proxy node can be different, and thus the proxy node that receives the unicast message can determine whether the unicast message is forwarded through a proxy node by identifying a transmission port of the unicast message, if yes, step 960 can be directly executed by skipping step 920, and otherwise step 920 can be executed.

At step 960, an ID of a proxy node corresponding to the ID of the destination blockchain node is determined based on the local routing table, and an IP of the proxy node connected to the destination blockchain node is obtained.

At step 970, whether the proxy node connected to the destination blockchain node is a current proxy node is determined.

The proxy node 730-*m* in the relay node 310-*i* can further determine whether the destination blockchain node is connected to a current proxy node when determining that the destination blockchain node is connected to the current relay node.

It should be understood that any proxy node can save an IP of the current proxy node, so whether the proxy node connected to the destination blockchain node is the current proxy node can be determined by comparing the IP of the proxy node connected to the destination blockchain node with the IP of the current proxy node.

If yes, step 980 is performed, and otherwise step 990 is performed.

At step 980, the unicast message is transmitted to the connected destination blockchain node.

At step 990, the unicast message is transmitted to the proxy node connected to the destination blockchain node based on the IP of the proxy node connected to the destination blockchain node.

The proxy node 730-*m* in the relay node 310-*i* can transmit the unicast broadcast message to the connected destination blockchain node when determining that the destination blockchain node is connected to the current proxy node. The proxy node 730-*m* in the relay node 310-*i* can transmit the unicast message to a proxy node 730-*n* in the same relay node based on an IP of the proxy node 730-*n* in the same relay node when determining that the destination blockchain node is connected to another proxy node (can be denoted as the proxy node 730-*n*) in the same relay node. As such, the proxy node 730-*n* in the relay node 310-*i* can transmit the unicast messages to the connected destination blockchain node. Referring to the previous content, the proxy node 730-*n* in the relay node 310-*i* can perform step 920 or can skip step 920 to directly perform step 960.

Figure 10:
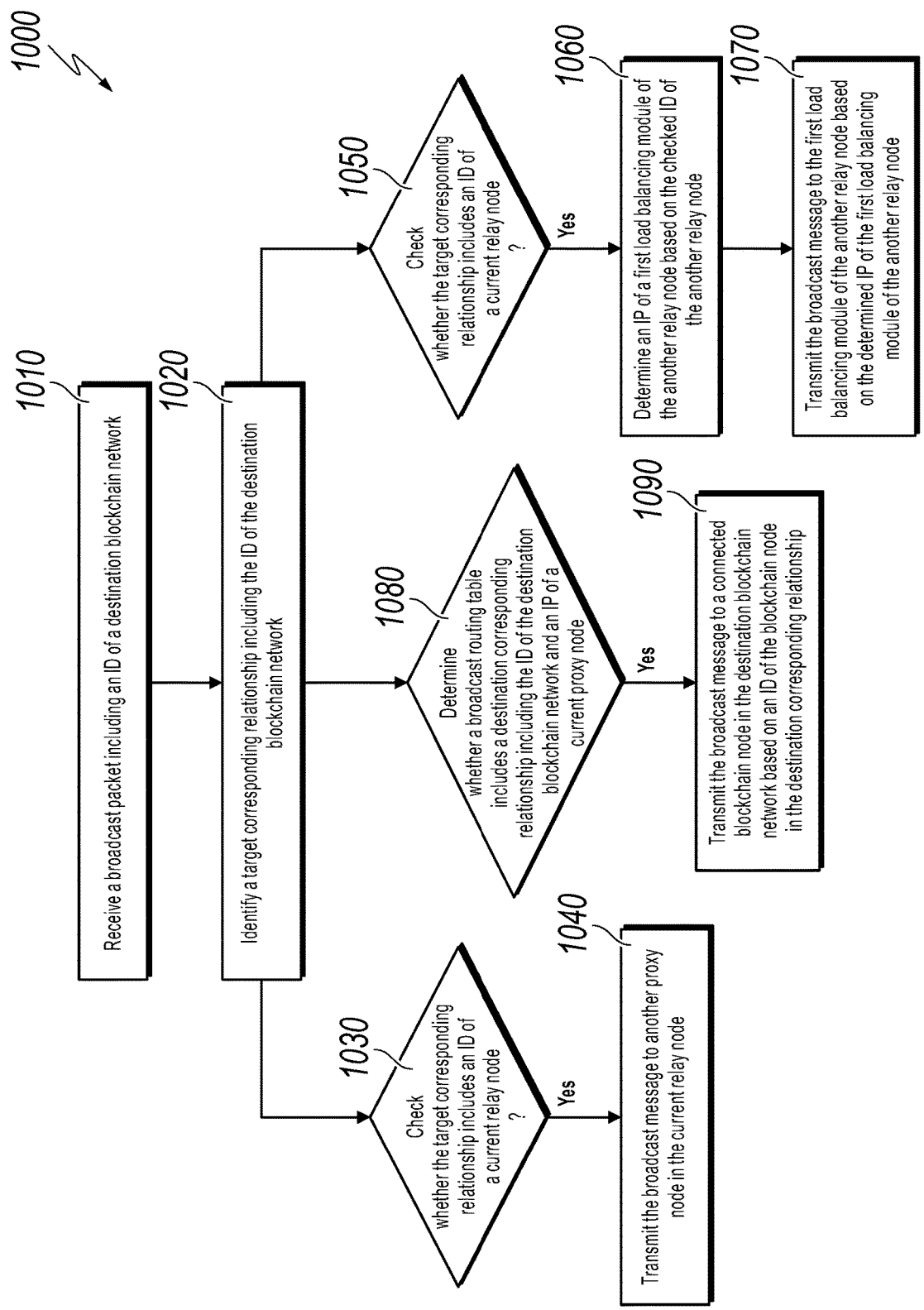
FIG. 10 is an example flowchart illustrating forwarding of a broadcast message by a proxy node in a multi-chain scenario, according to some embodiments of the present specification.

FIG. 10 is an example flowchart illustrating forwarding of a broadcast message by a proxy node in a multi-chain scenario, according to some embodiments of the present specification. For ease of description, a subject performing a process 1000 can be denoted as a proxy node 730-*m* in a relay node 310-*i*, and it should be understood that another proxy node 730-*n* (n≠m) within the relay node 310-*i* and a proxy node in another relay node 310-*j* (j≠i) within the system 300 can forward a message by referring to the process 1000. As shown in FIG. 10, the process 1000 can include:

At step 1010, a broadcast message including an ID of a destination blockchain network is received.

The destination blockchain network refers to a blockchain network that includes a blockchain node for receiving a broadcast message.

At step 1020, a target corresponding relationship including the ID of the destination blockchain network is searched for in a broadcast routing table.

The target corresponding relationship further includes an ID of a blockchain node in the destination blockchain network and an ID of a relay node connected to the blockchain node in the destination blockchain network for indicating the relay node connected to the blockchain node in the destination blockchain network.

At step 1030, whether the target corresponding relationship includes an ID of a current relay node is checked.

If yes, step 1040 is performed.

At step 1040, the broadcast message is transmitted to another proxy node in the current relay node.

When the target corresponding relationship includes the ID of the current relay node, it indicates that a proxy node in the relay node 310-$i$ is connected to the blockchain node in the destination blockchain network, and therefore the proxy node 730-$m$ in the relay node 310-$i$ that first receives the broadcast message can transmit one broadcast message to the another proxy node 730-$n$ (n≠m) in the relay node 310-$i$. As such, each proxy node in the relay node 310-$i$ can receive one broadcast message.

At step 1050, whether the target corresponding relationship includes an ID of another relay node is checked.

If yes, step 1060 is performed.

At step 1060, an IP of a first load balancing module of the another relay node is determined based on the checked ID of the another relay node.

At step 1070, the broadcast message is transmitted to the first load balancing module of the another relay node based on the determined IP of the first load balancing module of the another relay node.

Assume that the relay node 310-$i$ checks that the target corresponding relationship includes an ID of the relay node 310-$j$ (j≠i), and the relay node 310-$i$ can determine an IP of a first load balancing module of the relay node 310-$j$ based on the ID of the relay node 310-$j$. Thus, the relay node 310-$i$ can transmit the broadcast message to the first load balancing module of the relay node 310-$j$ based on the IP of the first load balancing module of the relay node 310-$j$.

The first load balancing module of the relay node 310-$j$ can transmit the broadcast message to a certain proxy node (can be denoted as a proxy node 730-$p$) in the relay node 310-$j$ after receiving the broadcast message, and the proxy node 730-$p$ can transmit one broadcast message to another proxy node 730-$q$ (q≠p) in the relay node 310-$j$ after receiving the broadcast message.

It is worthwhile to note that a proxy in any relay node may not necessarily repeatedly forward a broadcast message to (a first load balancing module of) another relay node when receiving the broadcast message forwarded by a proxy node within the another relay node from a first load balancing module of a current relay node. For example, the proxy node 730-$m$ in a relay node 310-1 checks an ID of a relay node 310-2 from the target corresponding relationship, and the proxy node 730-$m$ in the relay node 310-1 can transmit one broadcast message to a first load balancing module of the relay node 310-2. The proxy node 730-$p$ in the relay node 310-2 can skip step 1020 and step 1050 to directly perform step 1040 and step 1080 after receiving the broadcast message from the first load balancing module of the relay node 310-2.

It can be understood that the proxy node that receives the broadcast message can determine whether step 1050 needs to be performed in a certain way. For example, a port configured to transmit a message by a blockchain node and a port configured to transmit a message by a proxy node can be different, so the proxy node that receives the broadcast message can determine whether the broadcast message is forwarded through a proxy node by identifying a transmission port of the broadcast message, if yes, step 1050 is performed, and otherwise, step 1050 is not performed.

At step 1080, whether the broadcast routing table includes a destination corresponding relationship including the ID of the destination blockchain network and an IP of a current proxy node is determined.

If yes, step 1090 is performed.

At step 1090, the broadcast message is transmitted to a connected blockchain node in the destination blockchain network based on an ID of the blockchain node in the destination corresponding relationship.

Based on the previous content, each proxy node in the relay node connected to the blockchain node in the destination blockchain network can receive one broadcast message. The proxy node that receives the broadcast message can check whether the broadcast routing table includes the destination corresponding relationship including the ID of the destination blockchain network and the IP of the current proxy node, if yes, it indicates that the current proxy node is connected to a blockchain node in the destination blockchain network, and the broadcast message can be transmitted to the connected blockchain node in the destination blockchain network based on an ID of the blockchain node in the destination corresponding relationship.

It can be understood that, any proxy node can directly check whether the broadcast routing table includes the destination corresponding relationship including the ID of the destination blockchain network ID and the IP of the current proxy node when receiving a broadcast message transmitted by another proxy node within the same relay node, it is not necessary to repeatedly transmit the broadcast message to the another proxy node in the same relay node, and it is also not necessary to repeatedly transmit the broadcast message to another relay node. Where the proxy node that receives the broadcast message can determine whether the broadcast message is forwarded through a proxy node by identifying a transmission port of the broadcast message.

Figure 11:
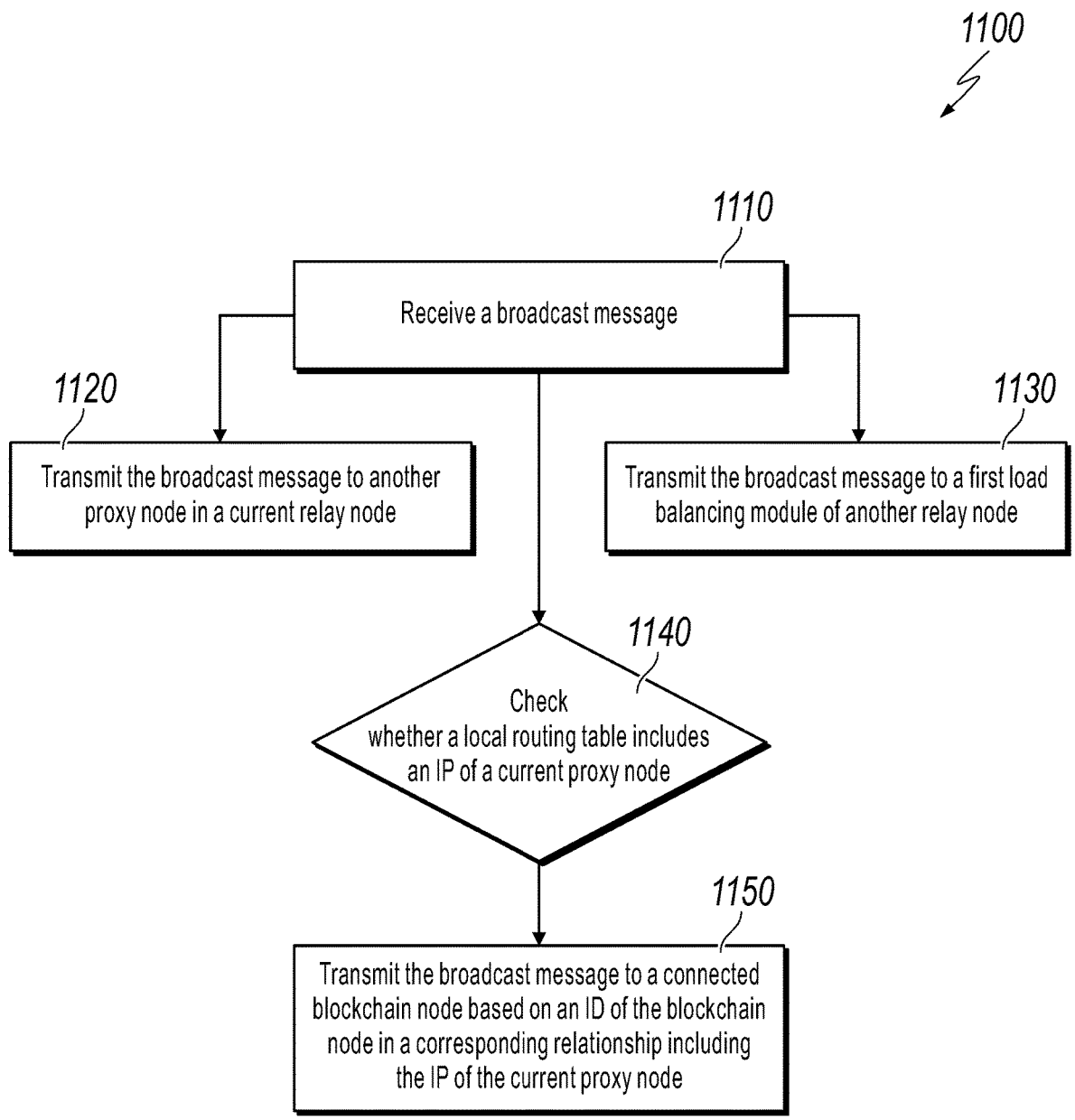
FIG. 11 is an example flowchart illustrating forwarding of a broadcast message by a proxy node in a single-chain scenario, according to some embodiments of the present specification.

FIG. 11 is an example flowchart illustrating forwarding a broadcast message by a proxy node in a single-chain scenario, according to some embodiments of the present specification. For ease of description, a subject performing a process 1100 can be denoted as a proxy node 730-$m$ in a relay node 310-$i$, and it should be understood that another proxy node 730-$n$ (n≠m) within the relay node 310-$i$ and a proxy node in another relay node 310-$j$ (j≠i) within the system 300 can forward a message by referring to the process 1100. As shown in FIG. 11, the process 1100 can include:

At step 1110, a broadcast message is received.

At step 1120, the broadcast message is transmitted to another proxy node in a current relay node.

At step 1130, the broadcast message is transmitted to a first load balancing module of another relay node.

Since the blockchain nodes connected to all the proxy nodes within the system 300 in a single-chain scenario belong to the same blockchain network, that is, each proxy node within the system 300 may be connected to a blockchain node for receiving a broadcast message, on the one hand, the proxy node 730-*m* in the relay node 310-*i* can transmit a broadcast message to the another proxy node 730-*n* in a current relay node (the relay node 310-*i*) after receiving the broadcast message, and on the other hand, the proxy node 730-*m* in the relay node 310-*i* can transmit the broadcast message to a first load balancing module of the another relay nodes 310-*j*.

The first load balancing module of the relay node 310-*j* can transmit the broadcast message to a certain proxy node (can be denoted as a proxy node 730-*p*) in the relay node 310-*j* after receiving the broadcast message, and the proxy node 730-*p* can transmit one broadcast message to another proxy node 730-*q* (q≠p) in the relay node 310-*j* after receiving the broadcast message.

It is worthwhile to note that a proxy node in any relay node may not necessarily repeatedly forward a broadcast message to another relay node after receiving the broadcast message forwarded by a proxy node within the another relay node from a first load balancing module of a current relay node. For example, the proxy node 730-*m* in a relay node 310-1 checks an ID of the relay node 310-2 from the target corresponding relationship, and the proxy node 730-*m* in the relay node 310-1 can transmit one broadcast message to a first load balancing module of the relay node 310-2. The proxy node 730-*p* in the relay node 310-2 may not perform step 1130 after receiving the broadcast message from the first load balancing module of the relay node 310-2.

It can be understood that the proxy node that receives the broadcast message can determine whether step 1130 needs to be performed in a certain way. For example, a port configured to transmit a message by a blockchain node and a port configured to transmit a message by a proxy node can be different, so the proxy node that receives the broadcast message can determine whether the broadcast message is forwarded through a proxy node by identifying a transmission port of the broadcast message, if yes, step 1130 is performed, and otherwise, step 1130 is not performed.

At step 1140, whether a local routing table includes an IP of a current proxy node is checked.

If yes, step 1150 can be performed.

At step 1150, the broadcast message is transmitted to a connected blockchain node based on an ID of the blockchain node in a corresponding relationship including the IP of the current proxy node.

Based on the previous content, each proxy node in the relay node connected to the blockchain node can receive one broadcast message. The proxy node that receives the broadcast message can check whether the local routing table includes the IP of the current proxy node, if yes, it indicates that the current proxy node is connected to a blockchain node, and the broadcast message can be transmitted to the connected blockchain node based on an ID of the blockchain node in a corresponding relationship including the IP of the current proxy node.

It can be understood that any proxy node can directly check whether the local routing table includes the IP of the current proxy node when receiving a broadcast message transmitted by another proxy node within the same relay node, it is not necessary to repeatedly transmit the broadcast message to the another proxy node in the same relay node, and it is also not necessary to repeatedly transmit the broadcast message to another relay node. In addition, the broadcast message can further include an ID of a source blockchain node, and any proxy node can determine an IP of a proxy node corresponding to the ID of the source blockchain node based on the local routing table, obtain the IP of the proxy node connected to the source blockchain node to determine whether the proxy node connected to the source blockchain node is a current proxy node, and if yes, the proxy node connected to the source blockchain node does not necessarily transmit the broadcast message to the source blockchain node.

Figure 12:
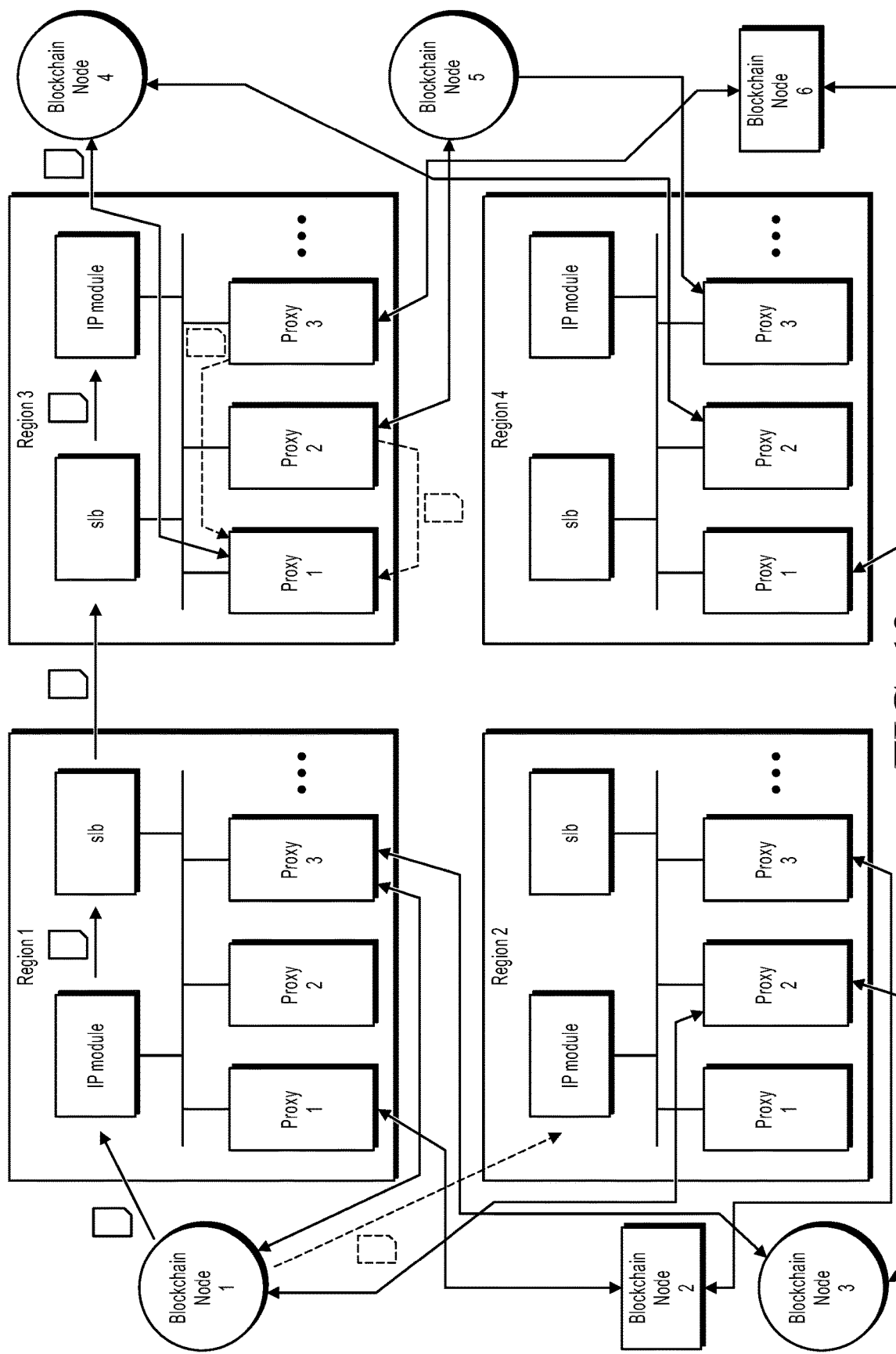
FIG. 12 is a schematic diagram illustrating forwarding of a unicast message by a proxy node, according to some embodiments of the present specification.

The flow of forwarding a unicast messages is illustrated below in conjunction with FIG. 12 and FIG. 13. As shown in FIG. 12, a first region is provided with two relay nodes having IDs of a region 1 and a region 2, respectively, a second region is provided with two relay nodes having IDs of a region 3 and a region 4, respectively, and a blockchain node 1, a blockchain node 2, and a blockchain node 3 in the first region all use the region 1 as a main relay node and the region 2 as a standby relay node, and a blockchain node 4, a blockchain node 5, and a blockchain node 6 in the second region all use the region 3 as a main relay node and the region 4 as a standby relay node. In addition, a first load balancer module is referred to as a server load balancer (SLB), and a proxy node is referred to as proxy. As such, the local routing table of each proxy node after updating is shown in FIG. 13. In FIG. 13, "1" is an identifier of a main relay node, and "0" is an identifier of a node standby relay node; a node 1 to a node 6 respectively represent IDs of the blockchain node 1 to the blockchain node 6; and ip_m represents an IP (address) of a proxy node numbered m in a corresponding relay node. For example, (node 1; region 1, 1; ip_3) indicates that the main relay node of the blockchain node 1 is the region 1, and includes an IP (address) of a proxy 3 (in region 1) connected to the blockchain node 1.

Based on this, referring to a message transmission path indicated by a solid line in FIG. 12, if the blockchain node 1 transmits a unicast message to the blockchain node 4, the blockchain node 1 preferentially transmits a unicast message including the ID (i.e. a node 4) of the blockchain node 4 to an IP module of the main relay node region 1. Inside the region 1, an IP module transmits the unicast message to an SLB, the SLB then transmits the unicast message to one (can be denoted as a first proxy node) of a group of proxy nodes, and the first proxy node can search for an ID of a region corresponding to the ID of the blockchain node 4 based on the local routing table. In conjunction with FIG. 13, corresponding relationships associated with the blockchain node 4 in the local routing table are (node 4; region 3, 1; ip_1) and (node 4; region 4, 0; ip_2). The first proxy node preferentially transmits the unicast message to an SLB of the main relay node region 3 of the blockchain node 4. Inside the region 3, the SLB transmits the unicast message to one (denoted as a second proxy node) of a group of proxy nodes, and the second proxy node can search for the ID of the region corresponding to the ID of the blockchain node 4 based on the local routing table to obtain an ID of a current relay node region 3, and thus can continue to search for an IP of a proxy node corresponding to the ID of the blockchain node 4. Referring to the message transmission path indicated by a solid line in FIG. 12, if the second proxy node is a proxy 1 in the region 3, then the proxy 1 in the region 3 can search for an IP of a current proxy node, it indicates that the blockchain node 4 is connected to the current proxy node, and then the proxy 1 in the region 3 can transmit the unicast message to the connected blockchain node 4. Referring to a message transmission path indicated by a dotted line in FIG. 12, if the second proxy node is an IP of a proxy node (such as a proxy 2 or a proxy 3) other than the proxy 1 in the region 3, the second proxy node can identify the IP of the proxy 1 and transmit the unicast message to the proxy 2 based on the IP of the proxy 1.

Referring to the message transmission path indicated by a dotted line in FIG. 12, if the blockchain node 1 determines that the main relay node region 1 fails (e.g. a message cannot be transmitted, or no response is received after a message is transmitted to the region 1), the blockchain node 1 can transmit the unicast message to an IP module of the standby relay node region 2. Similarly, inside the region 2, the IP module transmits the unicast message to an SLB, the SLB then transmits the unicast message to one (still denoted as a first proxy node) of a group of proxy nodes; and the first proxy node can search for the ID of the region corresponding to the ID of the blockchain node 4 based on the local routing table. As shown in FIG. 13, the corresponding relationships associated with the blockchain node 4 in the local routing table are (node 4; region 3, 1; ip_2) and (node 4; region 4, 0; ip_1). The first proxy node preferentially transmits the unicast message to an SLB of the main relay node region 3 of the blockchain node 4. Inside the region 3, the SLB transmits the unicast message to one (still denoted as a second proxy node) of a group of proxy nodes, and the second proxy node can search for the ID of the region corresponding to the ID of the blockchain node 4 based on the local routing table to obtain the ID of the current relay node region 3, and thus can continue to search for the IP of the proxy node corresponding to the ID of the blockchain node 4. If the IP of the current proxy node (the second proxy node) is identified, it indicates that the blockchain node 4 is connected to the current proxy node, the second proxy node can transmit the unicast message to the connected blockchain node 4. If an IP of another proxy node in the region 3 is identified, the unicast message is transmitted to the another proxy node in the region 3 based on the IP.

If the first proxy node in the region 1/region 2 determines that the main relay node region 3 of the blockchain node 4 fails (e.g. a message cannot be transmitted, or no response is received after a message is transmitted to the region 3), the first proxy node in the region 1/region 2 can transmit the unicast message to an SLB of the standby relay node region 4 of the blockchain node 4. The flow of forwarding a unicast message by the region 4, can refer to the flow of forwarding a unicast message by the region 3.

The flow of forwarding a unicast message is illustrated below in conjunction with FIG. 14 and FIG. 15. The same parts of FIG. 14 as those of FIG. 12 can refer to the related description about FIG. 12. In addition, a blockchain node 1, a blockchain node 3, a blockchain node 4, and a blockchain node 5 belong to the same blockchain network (denoted as a first blockchain network), and a blockchain node 2 and a blockchain node 6 belong to another blockchain network (denoted as a second blockchain network). As such, a broadcast routing table of each proxy node after updating is shown in FIG. 13. In FIG. 13, "1" is an identifier of a main relay node, and "0" is an identifier of a node standby relay node; a node 1 to a node 6 respectively represent IDs of the blockchain node 1 to the blockchain node 6; ip_m represents an IP (address) of a proxy node numbered m in a corresponding relay node; A represents an ID of the first blockchain network; and B represents an ID of the second blockchain network. For example, (A; region 1, 1; ip_3) indicates that a main relay node of the blockchain node 1 in the first blockchain network is a region 1, and includes an IP (address) of a proxy 3 (in the region 1) connected to the blockchain node 1.

Figure 14:
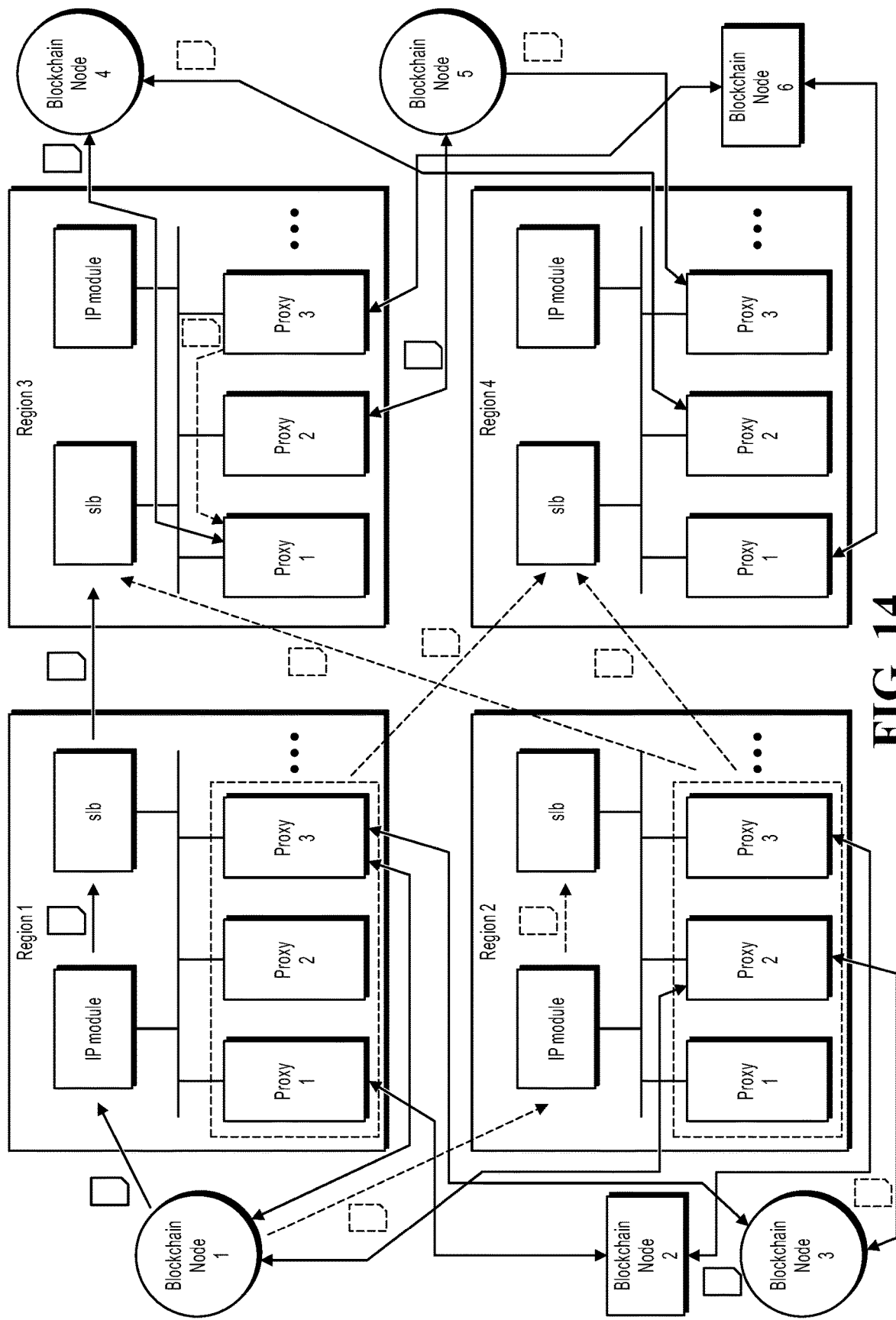
FIG. 14 is a schematic diagram illustrating forwarding of a broadcast message by a proxy node in a multi-chain scenario, according to some embodiments of the present specification.

Based on this, referring to a message transmission path indicated by a dotted line in FIG. 14, if the blockchain node 1 broadcasts on the first blockchain network, the blockchain node 1 preferentially transmits a broadcast message including the ID (i.e. A) of the first blockchain network to an IP module of the main relay node region 1. Inside the region 1, the IP module transmits a unicast message to an SLB, and the SLB then transmits the unicast message to one of a group of proxy nodes. As shown in FIG. 14, it can be assumed that a proxy 2 in the region 1 receives the broadcast message from the SLB. In conjunction with FIG. 15, in a broadcast routing table, corresponding relationships including the ID (i.e. A) of the first blockchain network includes (A; node 3; region 1, 1; ip_3), (A; node 3; region 2, 0; ip_2), (A; node 4; region 3, 1; ip_1), (A; node 4; region 4, 0; ip_2), (A; node 5; region 3, 1; ip_2), and (A; node 5; region 4, 0; ip_3) in addition to (A; node 1; region 1, 1; ip_3) and (A; node 1; region 2, 0; ip_2). Inside the region 1, the proxy 2 respectively transmits one broadcast message to another proxy node (e.g. a proxy 1 or a proxy 3). Since the main relay node of the blockchain node 4 and the blockchain node 5 in the first blockchain network is a region 3, the proxy 2 in the region 1 preferentially transmits one broadcast message to an SLB of the region 3. Inside the region 3, the SLB transmits the unicast message to one of a group of proxy nodes. As shown in FIG. 14, it can be assumed that a proxy 3 in the region 3 receives the broadcast message from the SLB. Inside the region 3, the proxy 3 can respectively transmit one unicast message to another proxy node (e.g. a proxy 1 or a proxy 2). As such, each proxy node in the region 1 and the region 3 can receive one broadcast message, where the proxy 3 in the region 1 connected to the blockchain node 3, the proxy 1 in the region 3 connected to the blockchain node 4, and the proxy 2 in the region 3 connected to the blockchain node 5 can respectively search for a corresponding relationship including the ID (i.e. A) of the first blockchain network and an IP of a current proxy node in the broadcast routing table after receiving the broadcast message, and respectively identify the ID of the blockchain node 3, the ID of the blockchain node 4, and the ID of the blockchain node 5. Accordingly, the proxy 3 in the region 1, the proxy 1 in the region 3, and the proxy 2 in the region 3 can respectively transmit the broadcast message to the connected blockchain node 3, blockchain node 4, and blockchain node 5.

Referring to a message transmission path indicated by a dotted line in FIG. 14, if the blockchain node 1 determines that the main relay node region 1 fails (e.g. a message cannot be transmitted, or no response is received after a message is transmitted to the region 1), the blockchain node 1 can transmit the broadcast message to an IP module of the standby relay node region 2. Inside the region 2, the IP module transmits the unicast message to an SLB, and then the SLB transmits the unicast message to one of a group of proxy nodes. Referring to the previous content, each proxy node within the region 2 can receive one broadcast message. Where a proxy 3 in the region 2 can search for the corresponding relationship (A; node 3; region 1, 1; ip_3) including the ID (i.e. A) of the first blockchain network and the IP of the current proxy node, it indicates that the blockchain node 3 is connected to the current proxy node (the proxy 3), so the proxy 3 in the region 2 can transmit the broadcast message to the connected blockchain node 3. Referring to the previous content, the proxy 3 in the region 2 can further preferentially transmit one broadcast message to the SLB of the main relay node region 3 of the blockchain node 4 and the blockchain node 5 based on the broadcast routing table.

The flow of forwarding a broadcast message by the region 3, can refer to the related description in the previous content.

If the proxy node (e.g. the proxy 2 in region 1) in the region 1/region 2 that first receives the broadcast message determines that the main relay node region 3 of the blockchain node 4 and the blockchain node 5 fails (e.g. a message cannot be transmitted, or no response is received after a message is transmitted to the region 3), the first proxy node in the region 1/region 2 can transmit the broadcast message to an SLB of the standby relay node region 4 of the blockchain node 4 and the blockchain node 5. The flow of forwarding a broadcast message by the region 4, can refer to the flow of forwarding a broadcast message by the region 3.

Figure 16:
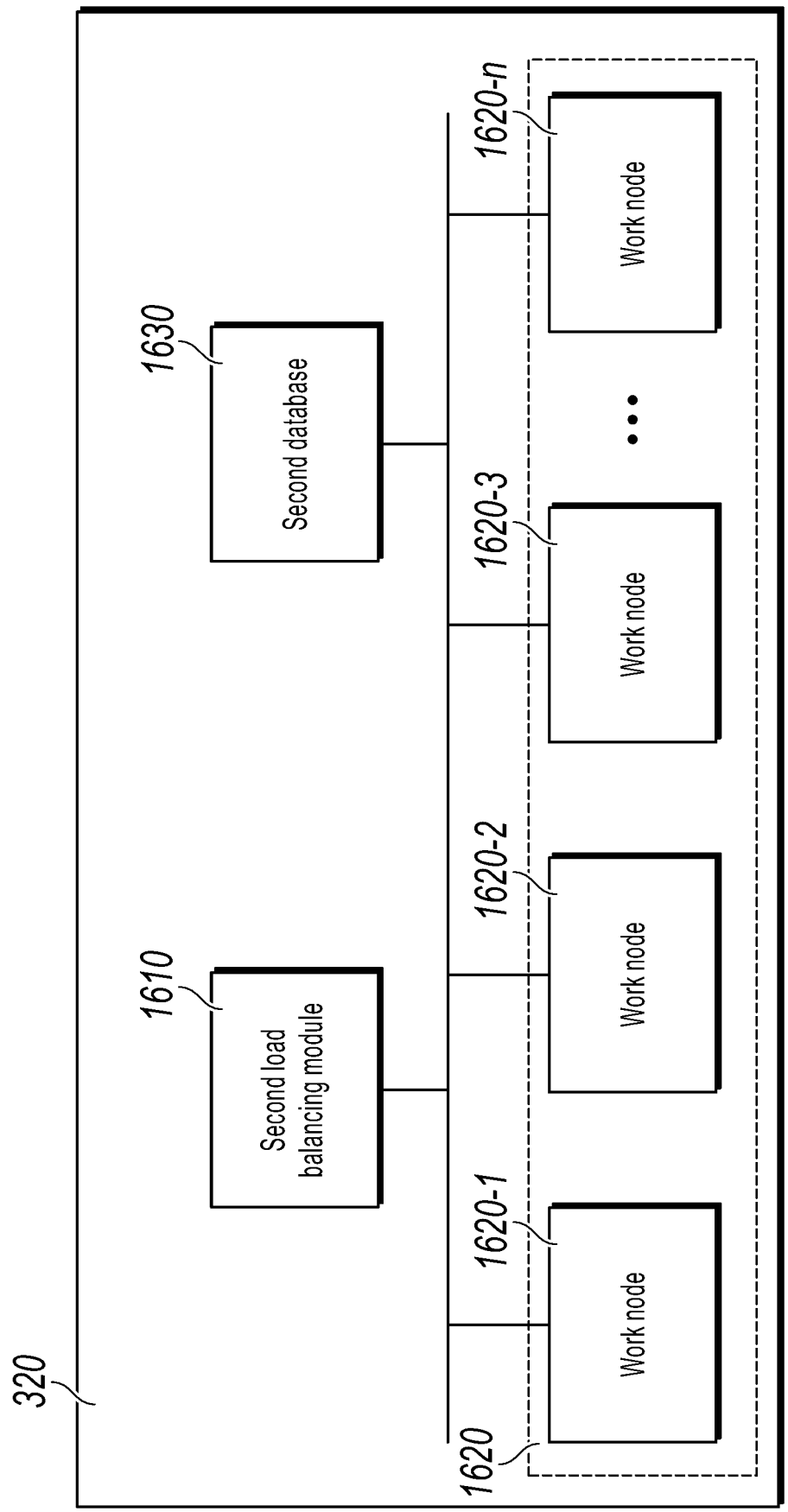
FIG. 16 is an example block diagram illustrating a global node, according to some embodiments of the present specification.

FIG. 16 is an example block diagram illustrating a global node, according to some embodiments of the present specification. As shown in FIG. 16, the global node 320 can include a second load balancing module 1610, a group of work nodes 1620, and a second database 1630.

The second load balancing module 1610 is configured to receive a registration event from a service discovery module and transmit the registration event to one of the group of work nodes 1620. In some embodiments, the second load balancing module 1610 can determine a work node from the group of work nodes 1620 to receive the registration event by using a roll polling algorithm.

The work node is configured to write the received registration event into the second database 1630. The group of work nodes within the global node are elastically scalable, that is, the number of the work nodes within the global node is variable. For illustration only, the global node 320 in FIG. 16 includes a work node 1620-1, a work node 1620-2, a work node 1620-3, . . . , and a work node 1620-$n$. Generally, the number of the work nodes within the global node can be consistent with the trend of the number of the relay nodes within the communication optimization system. That is, when the number of the relay nodes within the communication optimization system increases, the number of the work nodes within the global node can appropriately increase.

The work node is further configured to transmit a registration event of any relay node to a first load balancing module of another relay node. For example, as shown in FIG. 4, the work node can respectively transmit a registration event of a relay node 310-2 to a relay node 310-1, a relay node 310-3, . . . , and a relay node 310-$n$ after writing the registration event of the relay node 310-2 into the second database.

It is worthwhile to note that any relay node can include at least two IP modules/first load balancing modules/first databases for main-standby switching, and the global node can also include at least two second load balancing modules/second databases for main-standby switching.

Figure 17:
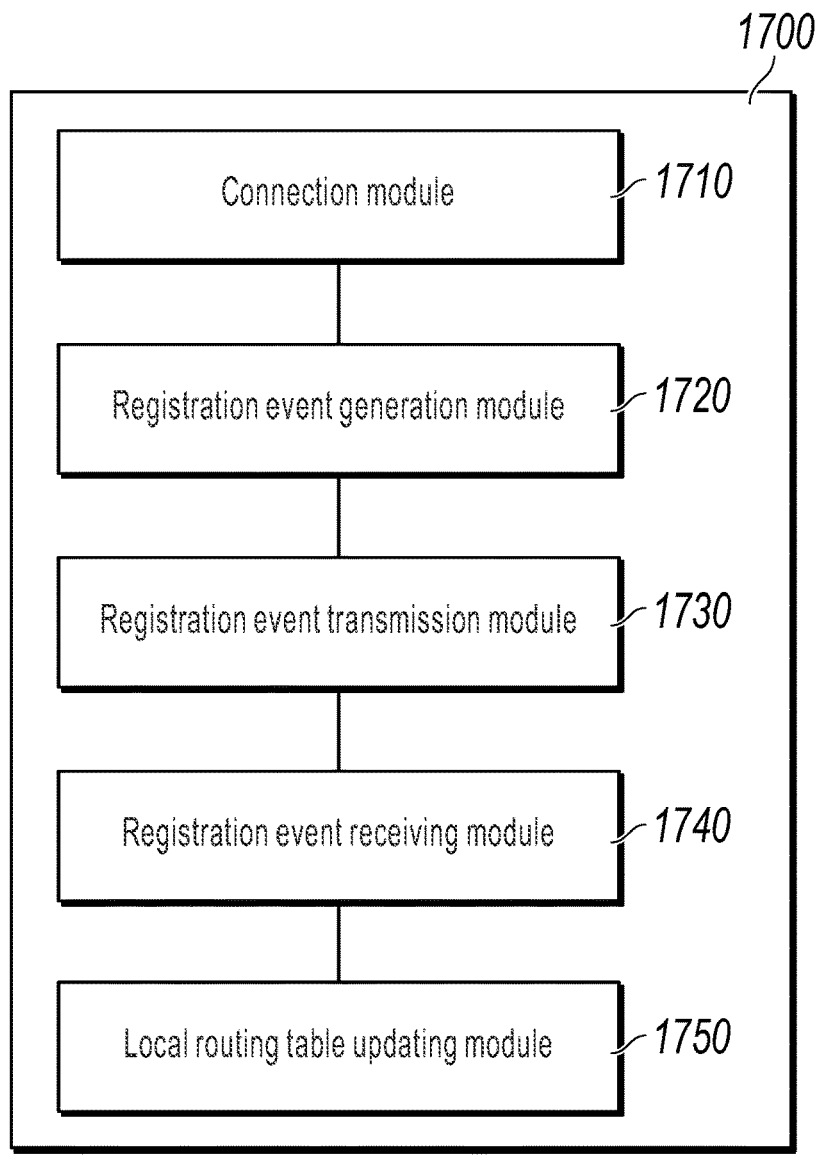
FIG. 17 is an example block diagram illustrating a registration system of a blockchain network-based communication optimization system, according to some embodiments of the present specification.

FIG. 17 is an example block diagram illustrating a registration system of a blockchain network-based communication optimization system, according to some embodiments of the present specification. A registration system 1700 can be implemented on any relay node (can be denoted as a relay node 310-$i$) in a relay node. As shown in FIG. 17, the registration system 1700 can include a connection module 1710, a registration event generation module 1720, a registration event transmission module 1730, a registration event receiving module 1740, and a local routing table updating module 1750.

The connection module 1710 can be configured to receive a registration request of a blockchain node from a first load balancing module of the relay node 310-$i$, and establish a connection with the blockchain node in response to the registration request.

The registration event generation module 1720 can be configured to generate a registration event based on the registration request.

The registration event transmission module 1730 can be configured to transmit the registration event to a service discovery module of the relay node 310-$i$, so: the service discovery module of the relay node 310-$i$ transmits the registration event to a global node, and the global node transmits the registration event to a service discovery module of another relay node 310-$j$ ($j \neq i$).

The registration event receiving module 1740 can be configured to receive a registration event of the another relay node 310-$j$ from the service discovery module of the relay node 310-$i$.

The local routing table updating module 1750 can be configured to update a local routing table based on the obtained registration event.

More details regarding the registration system 1700 and its modules can refer to FIG. 8 and the related description about FIG. 8, and are not repeated here.

Figure 18:
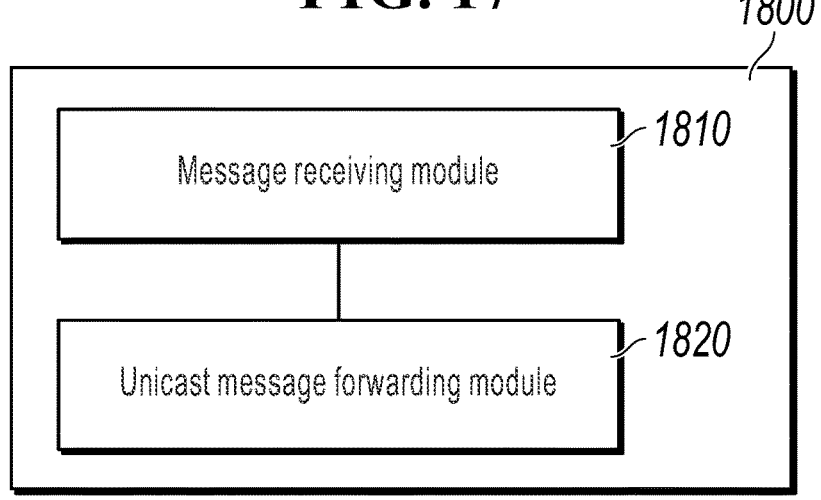
FIG. 18 is an example block diagram illustrating a message forwarding system of a blockchain network-based communication optimization system, according to some embodiments of the present specification.

FIG. 18 is an example block diagram illustrating a message forwarding system of a blockchain network-based communication optimization system, according to some embodiments of the present specification. A message forwarding system 1800 can be implemented on any relay node (can be denoted as a relay node 310-$i$) in a relay node. As shown in FIG. 18, the message forwarding system 1800 can include a message receiving module 1810 and a unicast message forwarding module 1820.

The message receiving module 1810 can be configured to receive a unicast message including an ID of a destination blockchain node from a first load balancing module of the relay node 310-$i$. A detailed description of receiving the unicast message including the ID of the destination blockchain node from the first load balancing module of the relay node 310-$i$ can refer to FIG. 9 and will not be repeated here.

The unicast message forwarding module 1820 can be configured to: determine whether a relay node connected to the destination blockchain node is a current relay node; if no, determine an IP of a first load balancing module of the relay node connected to the destination blockchain node based on an ID of the relay node connected to the destination blockchain node, and transmit the unicast message to the first load balancing module of the relay node connected to the destination blockchain node based on the IP of the first load balancing module of the relay node connected to the destination blockchain node; and if yes, determine whether a proxy node connected to the destination blockchain node is a current proxy node, if yes, transmit the unicast message to the connected destination blockchain node, and otherwise transmit the unicast message to the proxy node connected to the destination blockchain node based on the IP of the proxy node connected to the destination blockchain node.

More details regarding the message forwarding system 1800 and its modules can refer to FIG. 9 and the related description about FIG. 9, and are not repeated here.

Figure 19:
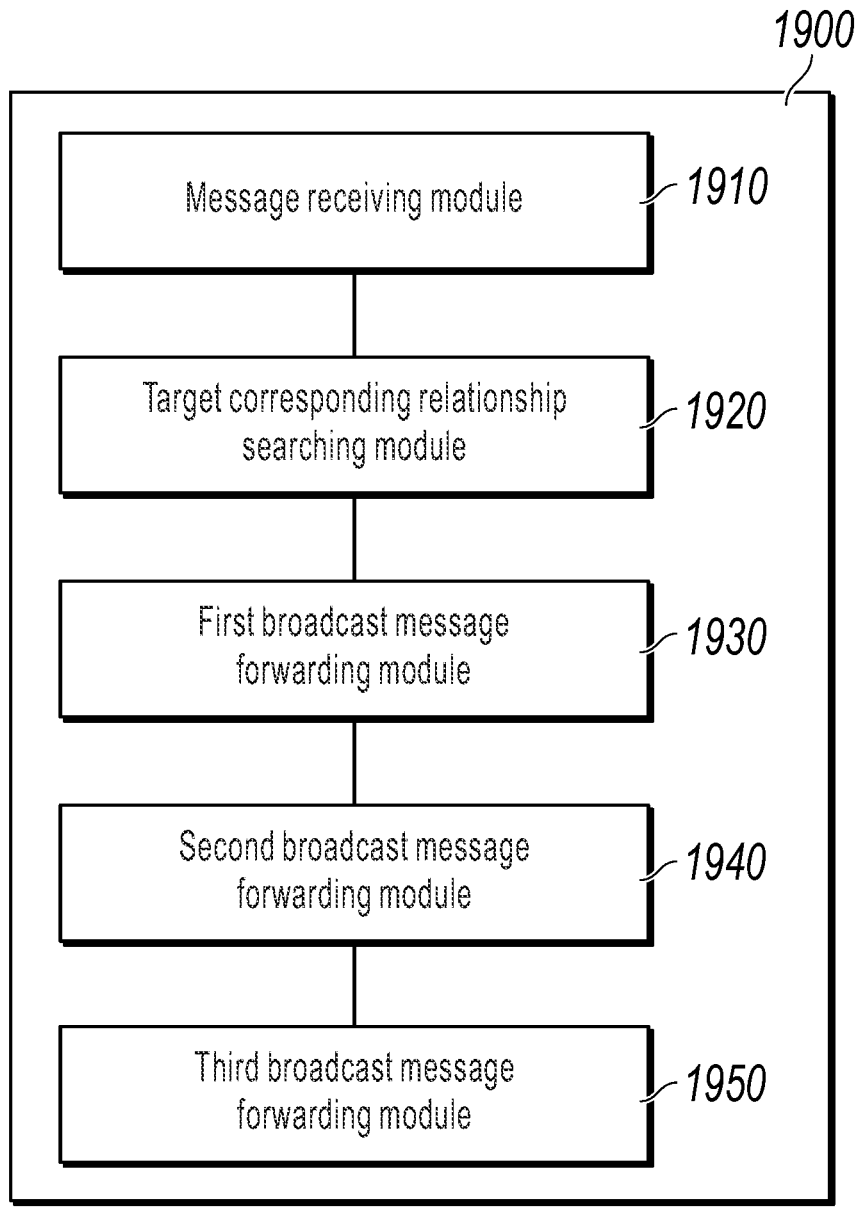
FIG. 19 is an example block diagram illustrating a message forwarding system of a blockchain network-based communication optimization system, according to some embodiments of the present specification.

FIG. 19 is an example block diagram illustrating a message forwarding system of a blockchain network-based communication optimization system, according to some embodiments of the present specification. A message forwarding system 1900 can be implemented on any relay node (can be denoted as a relay node 310-$i$) in a relay node. As shown in FIG. 19, the message forwarding system 1900 can include a message receiving module 1910, a target corresponding relationship searching module 1920, a first broadcast message forwarding module 1930, a second broadcast message forwarding module 1940, and a third broadcast message forwarding module 1950.

The message receiving module 1910 can be configured to receive a broadcast message including an ID of a destination blockchain network from a first load balancing module of the relay node 310-i.

The target corresponding relationship searching module 1920 can be configured to search for a target corresponding relationship including the ID of the destination blockchain network in a broadcast routing table.

The first broadcast message forwarding module 1930 can be configured to check whether the target corresponding relationship includes an ID of a current relay node, and if yes, transmit the broadcast message to another proxy node in the current relay node. For checking whether the target corresponding relationship includes the ID of the current relay node, if yes, the broadcast message is transmitted to the another proxy node in the current relay node.

The second broadcast message forwarding module 1940 can be configured to check whether the target corresponding relationship includes an ID of another relay node 310-j, and if yes, determine an IP of a first load balancing module of the another relay node 310-j based on the checked ID of the another relay node 310-j, and transmit the broadcast message to the first load balancing module of the another relay node 310-j based on the determined IP of the first load balancing module of the another relay node.

The third broadcast message forwarding module 1950 can be configured to check whether the broadcast routing table includes a destination corresponding relationship including the ID of the destination blockchain network and an IP of a current proxy node, and if yes, transmit the broadcast message to a connected blockchain node in the destination blockchain network based on an ID of the blockchain node in the destination corresponding relationship.

More details regarding the message forwarding system 1900 and its modules can refer to FIG. 10 and the related description about FIG. 10, and are not repeated here.

Figure 20:
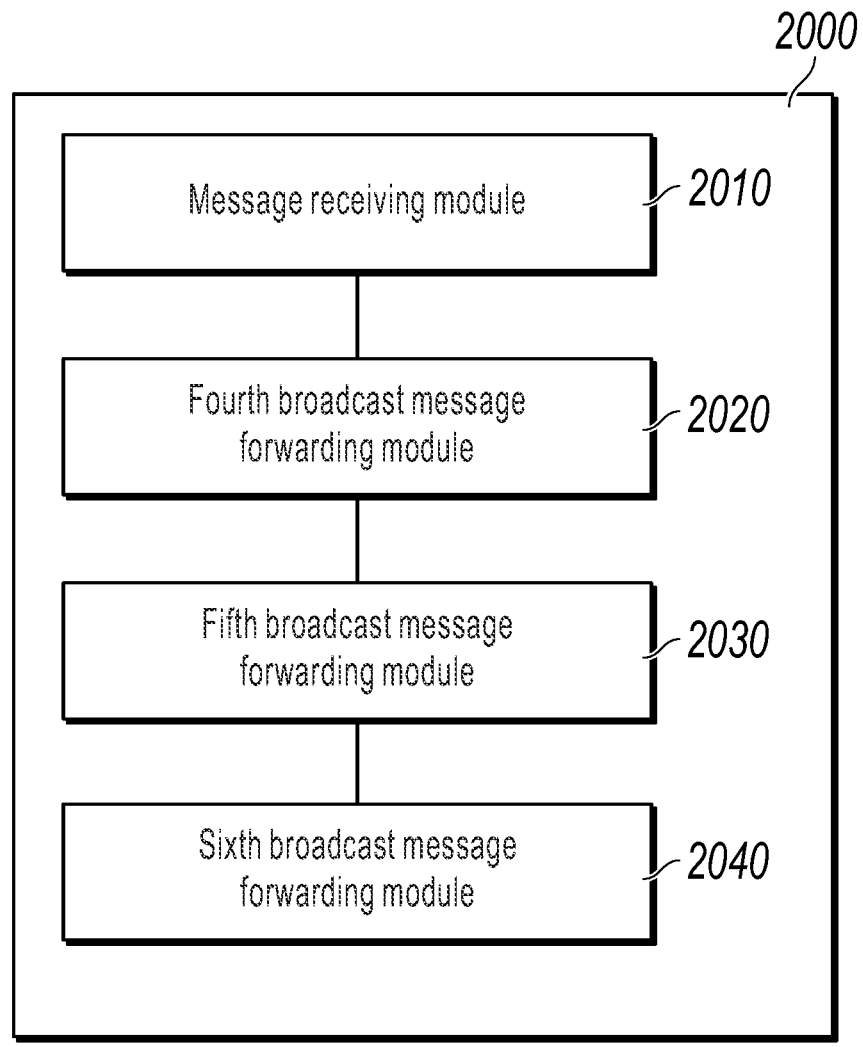
FIG. 20 is an example block diagram illustrating a message forwarding system of a blockchain network-based communication optimization system, according to some embodiments of the present specification.

FIG. 20 is an example block diagram illustrating a message forwarding system of a blockchain network-based communication optimization system, according to some embodiments of the present specification. A message forwarding system 2000 can be implemented on any relay node (can be denoted as a relay node 310-i) in a relay node. As shown in FIG. 20, the message forwarding system 2000 can include a message receiving module 2010, a fourth broadcast message forwarding module 2020, a fifth broadcast message forwarding module 2030, and a sixth broadcast message forwarding module 2040.

The message receiving module 2010 can be configured to receive a broadcast message from a first load balancing module of the relay node 310-i.

The fourth broadcast message forwarding module 2020 can be configured to transmit the broadcast message to another proxy node in a current relay node.

The fifth broadcast message forwarding module 2030 can be configured to transmit the broadcast message to a first load balancing module of another relay node 310-j.

The sixth broadcast message forwarding module 2040 can be configured to check whether a local routing table includes an IP of a current proxy node, and if yes, transmit the broadcast message to a connected blockchain node based on an ID of the blockchain node in a corresponding relationship including the IP of the current proxy node.

More details regarding the message forwarding system 2000 and its modules can refer to FIG. 11 and the related description about FIG. 11, and are not repeated here.

It should be understood that the systems and their modules shown in FIG. 17 to FIG. 20 can be implemented in various ways. For example, the system and the modules of the system can be implemented in hardware, software, or a combination of software and hardware. Where the hardware portion can be implemented by using dedicated logic; the software portion can be stored in a memory and executed by a suitable instruction execution system, such as a microprocessor or specially designed hardware. Those skilled in the art will appreciate that the previously described methods and systems can be implemented by using computer-executable instructions and/or being embodied in processor control code, and such code is provided, for example, on a carrier medium such as a disk, CD, or DVD-ROM, a programmable memory such as a read-only memory (firmware), or a data carrier such as an optical or electronic signal carrier. The devices and the modules of the devices of present specification can be implemented not only by a hardware circuit of, for example, a super-large-scale integrated circuit or gate array, a semiconductor such as a logic chip or transistor, or a programmable hardware device such as a field programmable gate array or programmable logic device, but also by software executed by, for example, various types of processors, as well as a combination of the previously described hardware circuit and software (e.g. firmware).

It is worthwhile to note that the previous descriptions about the systems are for ease of description only, but are not intended to limit the present specification to the scope of the illustrated embodiments. It can be understood that those skilled in the art, having knowledge of the principles of the system, can combine the various modules or construct a subsystem to connect to other modules without departing from the principles. For example, fourth broadcast message forwarding module 2020, fifth broadcast message forwarding module 2030, and sixth broadcast message forwarding module 2040 can be three separate modules or can be combined into one module. Such variations are within the scope of protection of the present specification.

Possible beneficial effects of the embodiments of the present specification include, but are not limited to: (1) in a single broadcast, a blockchain node can transmit one broadcast message to a relay node, so the occupation of an uplink bandwidth and a cross-regional bandwidth by the blockchain node can be effectively reduced; (2) a consortium node transmits a message through a relay node, an IP of the relay node can be added into a white list, so the IP white list does not need to be updated when a new consortium node joins the consortium blockchain; (3) the communication optimization system can be built based on an internal network, so the transmission time of a message is effectively reduced by forwarding the message of a blockchain node through a relay node; (4) a blockchain node establishes a connection with a nearby relay node in the communication optimization system, and the communication optimization system is built based on an internal network, so one broadcast message can be transmitted between the relay nodes in a single broadcast, and the transmission time of the message is effectively reduced. It is worthwhile to note that different embodiments can have different beneficial effects, and in different embodiments, the beneficial effects that can be produced can be any one or a combination of the previous beneficial effects, or any other beneficial effects that can be obtained.

The basic concepts have been previously described. Clearly, for those skilled in the art, the previous detailed disclosure is only an example, and does not constitute a limitation to the embodiments of the present specification. While not explicitly described here, those skilled in the art may make various modifications, improvements and amendments to the embodiments of the present specification. Such modifications, improvements, and amendments are suggested in the embodiments of the present specification, and are still within the spirit and scope of the example embodiments of the present specification.

Meanwhile, specific term are used to describe the embodiments of the present specification. Fox example, "one embodiment", "an embodiment", and/or "some embodiments" means a certain feature, structure, or characteristic related to at least one embodiment of the present specification. Therefore, it is emphasized and worthwhile to note that two or more references to "one embodiment" or "one embodiment" or "an alternative embodiment" in different places throughout the present specification are not necessarily referring to the same embodiment. Furthermore, some features, structures, or characteristics can be combined as appropriate in one or more embodiments of the present specification.

Moreover, those skilled in the art will appreciate that various aspects of the embodiments of the present specification can be illustrated and described in terms of several patentable species or contexts, including combinations of any novel and useful process, machine, product, material, or any novel and useful modification. Accordingly, various aspects of the embodiments of the present specification can be performed entirely by hardware, entirely by software (including firmware, resident software, microcode, etc.), or by a combination of hardware and software. The previous hardware or software can be referred to as a "data block", "module", "engine", "unit", "component", or "system". In addition, various aspects of the embodiments the present specification may be represented as a computer product in one or more computer readable media, and the product includes computer readable code.

A computer storage medium can include a propagated data signal including computer program code, for example, on a baseband or as part of a carrier wave. The propagated signal may be in a variety of forms, including an electromagnetic form, an optical form, etc. or a suitable combination of these forms. The computer storage medium can be any computer readable medium other than the computer readable storage medium that can communicate, propagate, or transmit the program for use by being connected to an instruction execution system, apparatus, or device. Program code in the computer storage medium can be propagated through any suitable medium including a radio, a cable, a fiber optic cable, RF, etc., or any combination of the previous media.

Computer program code needed for the operation of various portions of the embodiments of the present specification can be written in any one or more programming languages, including object oriented programming languages such as Java, Scala, Smalltalk, Eiffel, JADE, Emerald, C ++, C #, VB. NET, and Python, conventional procedural programming languages such as C, VisualBasic, Fortran 2003, Perl, COBOL 2002, PHP, and ABAP, dynamic programming languages such as Python, Ruby, and Groovy, or other programming languages, etc. The program code can run entirely on a user's computer, or as a stand-alone software package on the user's computer, or partially on the user's computer and partially on a remote computer, or entirely on a remote computer or processing device. In the latter case, the remote computer can be connected to the user's computer through any form of network, such as a local area network (LAN) or a wide area network (WAN), or to an external computer (e.g. through the Internet), or in a cloud computing environment, or used as a service, such as software as a service (SaaS).

Furthermore, the order of processing elements and sequences, the use of numerical letters, or the use of other designations in the embodiments of the present specification are not intended to limit the order of the processes and methods of the embodiments of the present specification, unless explicitly stated in the claims. While some presently considered useful embodiments of the invention have been discussed in the previous disclosure by way of examples, it should be understood that such details are for illustrative purposes only, and the appended claims are not limited to the disclosed embodiments. On the contrary, the claims are intended to cover all modifications and equivalent combinations that conform to the essence and scope of the embodiments of the present specification. For example, while the previously described system components can be implemented by hardware devices, but also be implemented by software-only solutions, for example, the described system is installed on an existing processing device or mobile device.

Similarly, it is worthwhile to note that in order to simplify the disclosure of the embodiments of the present specification to facilitate an understanding of one or more embodiments of the invention, various features can sometimes be incorporated into one embodiment, one drawing, or the description of the embodiment or drawing in the description about the embodiments of the present specification. However, the present disclosure method does not imply that more features are needed by the embodiments of the present specification than are recited in the claims. In fact, the features of the embodiment are less than all the features of the single embodiment previously disclosed.

Each of the patents, patent applications, patent application publications, and other materials cited in the present specification, such as articles, books, descriptions, publications, documents, etc., is hereby incorporated by reference in its entirety. Except for application history documents that are inconsistent with or conflict with the contents of the present specification, documents that limit the broadest scope of the claims of the present specification (whether currently or later appended to the present specification) are also excluded. It is worthwhile to note that descriptions, definitions, and/or terms used in the accompanying materials of the present specification are inconsistent or contradictory with the content of in the present specification, the descriptions, definitions, and/or terms used in the present specification shall control.

Finally, it should be understood that the embodiments of the present specification are merely used to illustrate the principles of the embodiments of the present specification. Other variations are possible within the scope of the embodiments of the present specification. Thus, by way of examples and not limitation, alternative configurations of the embodiments of the present specification can be considered consistent with the teachings of the present specification. Accordingly, the embodiments of the present specification are not limited to the embodiments explicitly described and illustrated in the present specification.

What is claimed is:

1. A computer-implemented method performed by a blockchain network, wherein the method comprises:
    establishing, by a first relay node in the blockchain network, a connection with a first blockchain node in the blockchain network in response to a connection request of the first blockchain node, wherein the blockchain network comprises the first blockchain node and at least one other blockchain node, the first blockchain node and the at least one other blockchain node are peer to peer (P2P) nodes, and after the establishing of the connection with the first blockchain node by the first relay node, the first blockchain node needs only transmit one broadcast message to the first relay node, rather than broadcasting the broadcast message to each of the at least one other blockchain node;

receiving, by the first relay node, a registration request transmitted by the first blockchain node, wherein the registration request comprises an ID of the first blockchain node and an ID of the first relay node connected to the first blockchain node;

generating, by the first relay node, a registration event based on the registration request, wherein the registration event comprises the ID of the first blockchain node and the ID of the first relay node connected to the first blockchain node;

updating, by the first relay node, a local routing table based on the registration event, wherein the local routing table comprises corresponding relationships among the ID of the first relay node and IDs of the at least one other blockchain node in the blockchain network that are connected to the first relay node, and a corresponding relationship between the ID of the first relay node and the ID of the first blockchain node connected to the first relay node; and forwarding, by the first relay node, a message of the first blockchain node to another relay node or each of the at least one other blockchain node in the blockchain network that is connected to the first relay node based on the corresponding relationships included in the local routing table.

2. The computer-implemented method according to claim 1, wherein the first relay node comprises an IP module, a first load balancing module, a group of proxy nodes, and a service discovery module, wherein the connection request comprises an IP of the IP module, and wherein:

establishing the connection with the first blockchain node comprises establishing the connection with the first blockchain node by using the IP module;

receiving the registration request of the first blockchain node further comprises transmitting the registration request to the first load balancing module of the first relay node by using the IP module; and forwarding the message of the first blockchain node further comprises transmitting the message to the first load balancing module of the first relay node by using the IP module.

3. The computer-implemented method according to claim 2, wherein:

transmitting the registration request of the first blockchain node by using the IP module of the first relay node further comprises transmitting the registration request to one of the group of proxy nodes within the first relay node;

forwarding the message of the first blockchain node by using the IP module of the first relay node further comprises transmitting the message to one of the group of proxy nodes within the first relay node; and forwarding the message of the first blockchain node further comprises transmitting the message to one of the group of proxy nodes within the first relay node.

4. The computer-implemented method according to claim 2, wherein the registration event further comprises an IP of a first proxy node connected to the first blockchain node, and wherein:

establishing the connection with the first blockchain node comprises establishing the connection with the first blockchain node by using the first proxy node;

generate the registration event based on the registration request further comprises transmitting the registration event to the service discovery module by using the first proxy node;

updating the local routing table based on the registration event comprises updating the local routing table by using the first proxy node;

forwarding the message of the first blockchain node based on the corresponding relationships included in the local routing table comprises forwarding the message by using the first proxy node; and the local routing table further comprises a corresponding relationship between the ID of the first blockchain node and the IP of the first proxy node connected to the first blockchain node.

5. The computer-implemented method according to claim 4, further comprising:

transmitting a registration event generated by the first proxy node in the first relay node to another proxy node in the first relay node by using the service discovery module;

transmitting the registration event generated by the first proxy node in the first relay node to a global node in the blockchain network by using the service discovery module, wherein the global node is configured to transmit the registration event to a service discovery module of the another relay node;

writing the registration event received from the first proxy node in the first relay node into a first database in the first relay node by using the service discovery module; and receiving a registration event of the another relay node from the global node and forwarding the registration event to each proxy node in the first relay node by using the service discovery module.

6. The computer-implemented method according to claim 4, wherein the first proxy node of the first relay node stores a corresponding relationship between an ID of the another relay node and an IP of a first load balancing module of the another relay node.

7. The computer-implemented method according to claim 2, wherein forwarding the message of the first blockchain node based on the local routing table comprises:

searching for an ID of a relay node corresponding to an ID of a destination blockchain node based on the local routing table after receiving a unicast message comprising the ID of the destination blockchain node;

obtaining an ID of a relay node connected to the destination blockchain node;

determining whether the relay node connected to the destination blockchain node is a current relay node;

in response to determining that the relay node connected to the destination blockchain node is not the current relay node, determining an IP of a first load balancing module of the relay node connected to the destination blockchain node based on the ID of the relay node connected to the destination blockchain node; and transmitting the unicast message to the first load balancing module of the relay node connected to the destination blockchain node based on the IP of the first load balancing module.

8. The computer-implemented method according to claim 7, further comprising:
in response to determining that the relay node connected to the destination blockchain node is the current relay node, searching for an IP of a proxy node corresponding to the ID of the destination blockchain node based on the local routing table;
obtaining an IP of the proxy node connected to the destination blockchain node;
determining whether the proxy node connected to the destination blockchain node is a current proxy node; and
in response to determining that the proxy node connected to the destination blockchain node is the current proxy node, transmitting the unicast message to the destination blockchain node, or
in response to determining that the proxy node connected to the destination blockchain node is not the current proxy node, transmitting the unicast message to the proxy node connected to the destination blockchain node based on the IP of the proxy node connected to the destination blockchain node.

9. The computer-implemented method according to claim 5, wherein the forwarding the message based on the corresponding relationships included in the local routing table comprises:
transmitting a broadcast message to another proxy node in the first relay node after receiving the broadcast message;
transmitting the broadcast message to a first load balancing module of the another relay node;
searching for a corresponding relationship comprising an IP of a current proxy node in the local routing table; and
transmitting the broadcast message to a connected blockchain node based on an ID of a blockchain node in the corresponding relationship.

10. The computer-implemented method according to claim 5, wherein the registration request further comprises an ID of a blockchain network that comprises the first blockchain node, and the registration event further comprises the ID of the blockchain network that comprises the first blockchain node.

11. The computer-implemented method according to claim 10, wherein:
the local routing table comprises a unicast routing table and a broadcast routing table, wherein the unicast routing table comprises a corresponding relationship between the ID of the first blockchain node, the IP of the proxy node connected to the first blockchain node, and the ID of the first relay node connected to the first blockchain node; and
the broadcast routing table comprises a corresponding relationship among the ID of the blockchain network, the ID of the first blockchain node in the blockchain network, the IP of the proxy node connected to the first blockchain node in the blockchain network, and the ID of the first relay node connected to the first blockchain node in the blockchain network.

12. The computer-implemented method according to claim 5, wherein a persistent connection is established between the first blockchain node and the first relay node through the IP of the first relay node.

13. The computer-implemented method according to claim 5, wherein a persistent connection is established between the first relay node and the another relay node through IPs of first load balancing modules in the first relay node and the another relay node.

14. The computer-implemented method according to claim 5, wherein a persistent connection is established between the group of proxy nodes in the first relay node through IPs of the group of proxy nodes.

15. The computer-implemented method according to claim 5, wherein a message body in the message is encrypted.

16. A non-transitory, computer-readable medium storing one or more instructions executable by a computer system to perform operations comprising:
establishing, by a first relay node in a blockchain network, a connection with a first blockchain node in the blockchain network in response to a connection request of the first blockchain node, wherein the blockchain network comprises the first blockchain node and at least one other blockchain node, the first blockchain node and the at least one other blockchain node are peer to peer (P2P) nodes, and after the establishing of the connection with the first blockchain node by the first relay node, the first blockchain node needs only transmit one broadcast message to the first relay node, rather than broadcasting the broadcast message to each of the at least one other blockchain node;
receiving, by the first relay node, a registration request transmitted by the first blockchain node, wherein the registration request comprises an ID of the first blockchain node and an ID of the first relay node connected to the first blockchain node;
generating, by the first relay node, a registration event based on the registration request, wherein the registration event comprises the ID of the first blockchain node and the ID of the first relay node connected to the first blockchain node;
updating, by the first relay node, a local routing table based on the registration event, wherein the local routing table comprises corresponding relationships among the ID of the first relay node and IDs of the at least one other blockchain node in the blockchain network that are connected to the first relay node, and a corresponding relationship between the ID of the first relay node and the ID of the first blockchain node connected to the first relay node; and
forwarding, by the first relay node, a message of the first blockchain node to another relay node or each of the at least one other blockchain node in the blockchain network that is connected to the first relay node based on the corresponding relationships included in the local routing table.

17. A computer-implemented system, comprising:
one or more computers; and
one or more computer memory devices interoperably coupled with the one or more computers and having tangible, non-transitory, machine-readable media storing one or more instructions that, when executed by the one or more computers, perform operations comprising:
establishing, by a first relay node in a blockchain network, a connection with a first blockchain node in the blockchain network in response to a connection request of the first blockchain node, wherein the blockchain network comprises the first blockchain node and at least one other blockchain node, the first blockchain node and the at least one other blockchain node are peer to peer (P2P) nodes, and after the establishing of the connection with the first blockchain node by the first relay node, the first blockchain node needs only transmit one broadcast message to the first relay node, rather than broadcasting the broadcast message to each of the at least one other blockchain node;

receiving, by the first relay node, a registration request transmitted by the first blockchain node, wherein the registration request comprises an ID of the first blockchain node and an ID of the first relay node connected to the first blockchain node;

generating, by the first relay node, a registration event based on the registration request, wherein the registration event comprises the ID of the first blockchain node and the ID of the first relay node connected to the first blockchain node;

updating, by the first relay node, a local routing table based on the registration event, wherein the local routing table comprises corresponding relationships among the ID of the first relay node and IDs of the at least one other blockchain node in the blockchain network that are connected to the first relay node, and a corresponding relationship between the ID of the first relay node and the ID of the first blockchain node connected to the first relay node; and forwarding, by the first relay node, a message of the first blockchain node to another relay node or each of the at least one other blockchain node in the blockchain network that is connected to the first relay node based on the corresponding relationships included in the local routing table.

18. The computer-implemented system according to claim 17, wherein the first relay node comprises an IP module, a first load balancing module, a group of proxy nodes, and a service discovery module, wherein the connection request comprises an IP of the IP module, and wherein:

establishing the connection with the first blockchain node comprises establishing the connection with the first blockchain node by using the IP module;

receiving the registration request of the first blockchain node further comprises transmitting the registration request to the first load balancing module of the first relay node by using the IP module; and forwarding the message of the first blockchain node further comprises transmitting the message to the first load balancing module of the first relay node by using the IP module.

19. The computer-implemented system according to claim 18, wherein:

transmitting the registration request of the first blockchain node by using the IP module of the first relay node further comprises transmitting the registration request to one of the group of proxy nodes within the first relay node;

forwarding the message of the first blockchain node by using the IP module of the first relay node further comprises transmitting the message to one of the group of proxy nodes within the first relay node; and forwarding the message of the first blockchain node further comprises transmitting the message to one of the group of proxy nodes within the first relay node.

20. The computer-implemented system according to claim 18, wherein the registration event further comprises an IP of a first proxy node connected to the first blockchain node, and wherein:

establishing the connection with the first blockchain node comprises establishing the connection with the first blockchain node by using the first proxy node;

generate the registration event based on the registration request further comprises transmitting the registration event to the service discovery module by using the first proxy node;

updating the local routing table based on the registration event comprises updating the local routing table by using the first proxy node;

forwarding the message of the first blockchain node based on the corresponding relationships included in the local routing table comprises forwarding the message by using the first proxy node; and the local routing table further comprises a corresponding relationship between the ID of the first blockchain node and the IP of the first proxy node connected to the first blockchain node.

* * * * *